(12) United States Patent
Sommerfeld et al.

(10) Patent No.: US 6,481,937 B1
(45) Date of Patent: Nov. 19, 2002

(54) ADJUSTABLE HOLDING DEVICE

(75) Inventors: Craig A. Sommerfeld, Kelley; Todd Sommerfeld, Ankeny, both of IA (US)

(73) Assignee: Craig A. Sommerfield, Kelley, IA (US)

( * ) Notice: Subject to any disclaimer, the term of this patent is extended or adjusted under 35 U.S.C. 154(b) by 4 days.

(21) Appl. No.: 09/644,609

(22) Filed: Aug. 23, 2000

(51) Int. Cl.⁷ .......................... B23B 45/14; B23B 49/02
(52) U.S. Cl. ............................ 408/115 R; 408/72 R; 408/103
(58) Field of Search ................... 408/97, 103, 115 R, 408/72 R

(56) References Cited

U.S. PATENT DOCUMENTS

| | | | |
|---|---|---|---|
| 2,181,746 A | 11/1939 | Siebrandt | 128/83 |
| 2,260,784 A | 10/1941 | Morton | 408/103 |
| 2,602,238 A | 7/1952 | Wellman | 33/189 |
| 2,674,907 A | 4/1954 | Zoll | 77/62 |
| 3,386,318 A | 6/1968 | Pekarcik et al. | 77/62 |
| 3,626,513 A | 12/1971 | Pytlak | 408/115 |
| 4,601,618 A | 7/1986 | McEldowney | 408/1 R |
| 4,730,959 A | 3/1988 | Aerni et al. | 408/115 R |
| 4,747,588 A | 5/1988 | Dillhoff | 269/6 |
| 4,955,766 A | 9/1990 | Sommerfeld | 408/87 |
| 5,163,792 A | 11/1992 | Slavik | 408/97 |
| 5,676,500 A | 10/1997 | Sommerfeld | 408/103 |
| 5,791,835 A | * 8/1998 | Chaing et al. | 408/115 R |
| 5,954,461 A | * 9/1999 | Lemieux | 408/115 R |
| 6,254,320 B1 | * 7/2001 | Weinstein et al. | 408/103 |
| 6,283,685 B1 | * 9/2001 | Lemieux | 408/115 R |

FOREIGN PATENT DOCUMENTS

| | | | |
|---|---|---|---|
| DE | 144100 | 10/1912 | |
| DE | 8613606 | 7/1986 | B27C/3/08 |
| FR | 2360370 | 3/1978 | B23B/49/00 |
| GB | 431711 | 7/1935 | |
| GB | 460965 | 2/1937 | |

OTHER PUBLICATIONS

"Pocket–Hole", *Wood Magizine*, pp. 38–40, (Jan. 1995).
"Pocket–Hole Jigs", *American Woodworker*, pp. 84–89, (Apr. 1999).

* cited by examiner

*Primary Examiner*—Steven C. Bishop

(57) ABSTRACT

An adjustable holding device comprising a base and a guide removably secured to the base is disclosed. In one embodiment, more than two guide channels are angularly disposed within the guide to guide a drill bit, wherein the more than two guide channels provide multiple two-hole drilling combinations. In another embodiment, a step block is used to elevate the workpiece, thus allowing thinner workpieces to be accurately drilled. In yet another embodiment, a riser block is used to elevate and move the guide laterally backwards to allow thicker workpieces to be accurately drilled. In yet another embodiment, support wings can be used not only to support a large workpiece, but can also be used as a pre-drill guide for depth collar positioning along a drill bit.

16 Claims, 21 Drawing Sheets

ADJUSTABLE HOLDING DEVICE

FIELD

This invention relates generally to holding devices and, more particularly, to adjustable holding devices.

BACKGROUND

Pocket hole wood joinery involves joining boards by inserting a fastener at an angle through the edge of one board into the other. Such joints are commonly used for face frames, cabinet boxes, leg-to-rail joinery in chairs and tables, and so forth. Drill guides or jigs are used to drill the holes through which the fasteners or pocket screws are inserted into the adjoining workpiece. Typical jigs or pocket hole devices provide for drilling of two fixed holes a predetermined distance apart. However, such an arrangement does not provide the flexibility needed to accommodate varying sizes of workpieces. As a result, pocket holes may be drilled too close to the edge of a workpiece or too far apart from each other.

One alternative is to move the workpiece after drilling the first hole, in order to more properly place the second hole. However, this is time-consuming and can produce less than accurate results. In some instances, only one hole is drilled. However, the resulting joint may not be as strong as needed. Handheld devices can also be used for custom-placement of holes, such as in remodeling or repair work, but are generally not an efficient means of pre-drilling a large quantity of holes.

Attempts to provide increased adjustability include jigs having guides that are movable along a rail. However, the ability to drill two holes in close proximity is limited with this type of device due to the width of the guides themselves. Furthermore, since the clamp is a self-contained fixed clamp, the practical usage of this type of device is limited, since a workpiece needs to be positioned relatively centrally against a clamp prior to drilling.

For the reasons stated above, and for other reasons stated below which will become apparent to those skilled in the art upon reading and understanding the present specification, there is a need in the art for an improved adjustable holding device.

SUMMARY

An adjustable holding device comprising a base and a guide removably secured to the base is disclosed. In one embodiment, more than two guide channels are angularly disposed within the guide to guide a drill bit, wherein the more than two guide channels provide multiple drilling combinations. In another embodiment, a step block is used to elevate the workpiece, thus allowing thinner workpieces to be accurately drilled. In yet another embodiment, a riser block is used to elevate and move the guide laterally backwards to allow thicker workpieces to be accurately drilled. In yet another embodiment, support wings can be used not only to support a large workpiece, but can also be used as a pre-drill guide for depth (i.e., stop) collar positioning along a drill bit.

The invention also includes a method for drilling pocket holes in a workpiece comprising providing an adjustable holding device having a base and a repositionable guide, wherein more than two guide channels are angularly disposed within the guide; placing the adjustable holding device on a planar surface; drilling a first hole in the workpiece with a stepped drill bit having a depth collar, the workpiece clamped to the adjustable holding device with a clamp, the clamp attached to the base; and drilling a second hole in the workpiece, wherein the first and second holes are both substantially perpendicular to the edge of the workpiece. In one embodiment, additional holes are also drilled perpendicular to the edge of the workpiece.

The adjustable holding devices or jigs of the present invention allow a user, for the first time, to drill pocket holes different distances apart, in materials of varying thicknesses and widths, without the need to adjust the holding device or the workpiece in between drilling. In one embodiment, the use of three separate and fixed guide channels with varied spacing allows three different two-hole combinations to be drilled quickly and accurately without the use of moving parts.

DETAILED DESCRIPTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

Figure 1A:
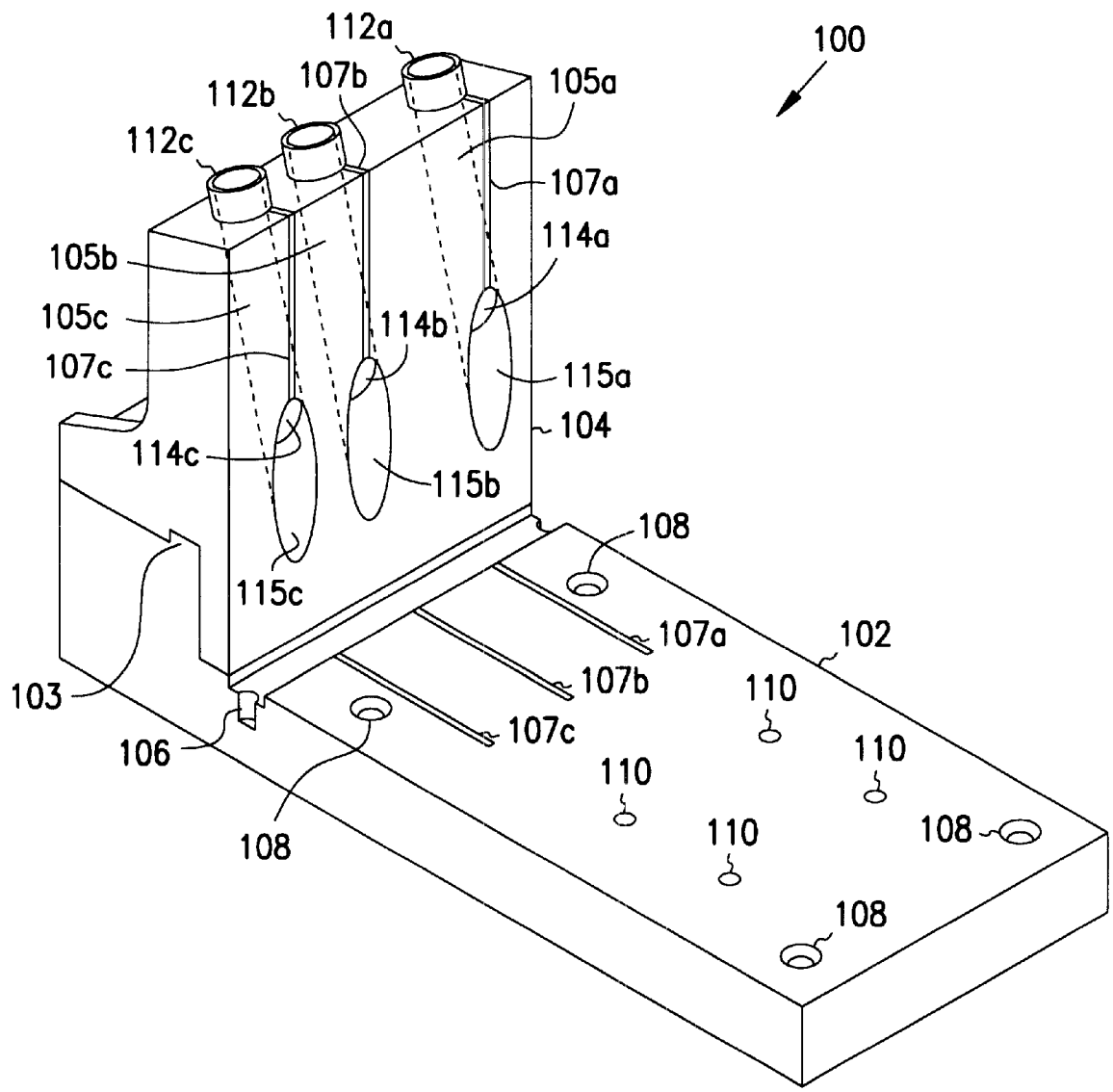
FIG. 1A is a perspective front view of an adjustable holding device in one embodiment of the present invention.

An adjustable holding device is disclosed. As shown in FIG. 1A, the adjustable holding device 100 is comprised of a base 102 and a guide 104. The base 102 can be any suitable size and shape. In the embodiment shown in FIG. 1A, the base 102 has a substantially horizontal planar surface ("substantially horizontal portion") and an upright portion on one end (partially behind and underneath the guide 104) to which the guide 104 is secured. In the embodiment shown in FIG. 1A, the base 102 further has a raised notch 103 in the upright portion (with a corresponding "cut-out" in the guide 104) to help secure the guide 104, although the invention is not so limited. As shown in FIG. 1A, the base 102 can further have a depression 106 extending along the entire width of the substantially horizontal portion to help secure a step block (FIGS. 3–4) in place. The base 102 can also have recessed openings 108 through which screws can be inserted for attachment of the base 102 to a workbench or other surface, although the invention is not so limited. Additional clamp holes 110 can also be pre-drilled in the base 102 for screws used to hold a self-contained clamp (described below) in place.

In one embodiment, the base 102 is about two (2) to four (4) inches (about 5.1 to 10.2 cm) wide and about six (6) to 12 inches (about 15.2 to 30.4 cm) in total length, although the invention is not so limited. The substantially horizontal portion of the base 102 can be any suitable height, such as about 0.5 to one (1) inch (about 1.3 to 2.5 cm) in height, with the upright portion of the base 102 between about 0.75 and three (3) inches (1.9 to 7.6 cm) in height. In a particular embodiment, the base 102 is about three (3) inches (7.6 cm) wide, about 9.5 inches (24 cm) in length, with the substantially horizontal portion about one (1) inch (2.5 cm) in height and the upright portion about 1.5 inches (3.8 cm) in height. The notch 103 in the upright portion can be any suitable height and depth, such as about 0.125 inches (0.3 cm) and about 0.25 inches (0.64 cm), respectively. Similarly, the depression 106 can be any suitable size, such as about 0.125 inches (0.3 cm) below the top surface of the substantially horizontal portion of the base 102 and about 0.25 inches (0.64 cm) in depth.

Figure 23:
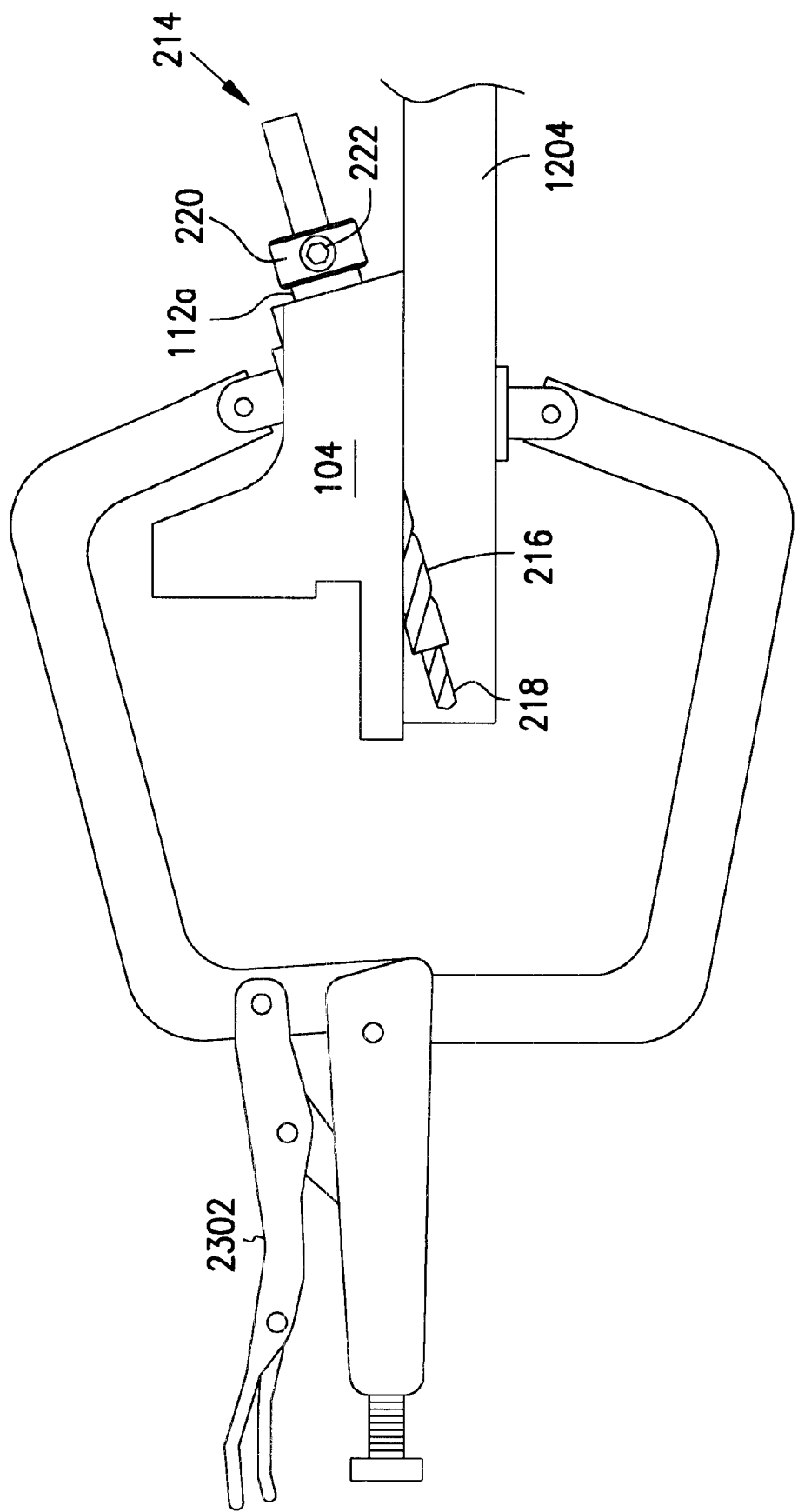
FIG. 23 is a side view of a guide portion of the adjustable holding device in use without the base portion in one embodiment of the present invention.

The guide 104 can also be any suitable size and shape, but is designed to be removably secured to the upright portion of the base 102. In the embodiment shown in FIG. 1A, the guide 104 has a substantially vertical planar surface. In this embodiment, the guide 104 is irregularly shaped, with substantially vertically sides that include a curved portion and an angled top portion, although the invention is not so limited. Any suitable configuration can be used, as long as the base 102 and guide 104 can be removably joined to provide suitable surfaces against which workpieces can be placed when having holes drilled, such as pocket holes. In one embodiment, the bottom surface of the guide 104 is not contiguous with the substantially horizontal portion of the base 102, such that the upright portion of the base 102 is exposed when the two components are joined together. In another embodiment, the guide 104 is used alone with a separate clamp (See FIG. 23).

In many of the embodiments shown herein, positioning marks 107 are also located on both the base 102 and guide 104. The positioning marks 107 are essentially small grooves that can be of any suitable depth, such as up to about 0.05-inches (0.13 cm) or more. These grooves are located along the centerline of the guide channels 105a, 105b and 105c discussed below. Such marks help the user better align where holes are positioned on a workpiece. In one embodiment, a user can make a mark on the workpiece at a location opposite of where a hole is to be drilled. This mark can then be lined up with the appropriate positioning mark 107. In most instances relating to pocket-hole drilling, however, such precision is not required.

As noted above, the guide 104 is provided with multiple guide channels 105a, 105b and 105c. The axial bore of each guide channel 105a, 105b and 105c is disposed to receive and guide the shank of a drill bit, e.g., see FIGS. 2–3, and described in U.S. Pat. No. 4,955,766 to Craig Sommerfeld, 1990 (hereinafter "Sommerfeld"). The guide channels 105a, 105b and 105c are angularly disposed with respect to the vertical planar surface. Although the precise angle can vary, an angle of about 15 degrees is commonly used to form pocket joints in wooden or composite (i.e., material dense fiberboard (MDF), particle board, etc.) workpieces, although the invention is not so limited. The angle can also be greater or less than 15 degrees. In a particular embodiment the angle is about 14 degrees.

The upper end of each guide channel 105a, 105b and 105c forms a stop flange 112a, 112b and 112c, respectively. The lower end of each guide channel 105a, 105b and 105c is contained within the guide 104, just above exit holes 114a, 114b and 114c in the back of the guide 104 and guide openings 115a, 115b and 115c in the front of the guide 104 (See FIGS. 1A and 1B). The exit holes 114a, 114b and 114c serve as "chip breakers," by allowing chips generated during drilling to exit. The guide openings 115a, 115b and 115c help to further guide a drill bit and also serve as "chip breakers." The guide openings 115a, 115b and 115c further allow the drill bit to exit the front side of the guide 104 and make contact with a workpiece.

Figure 1B:
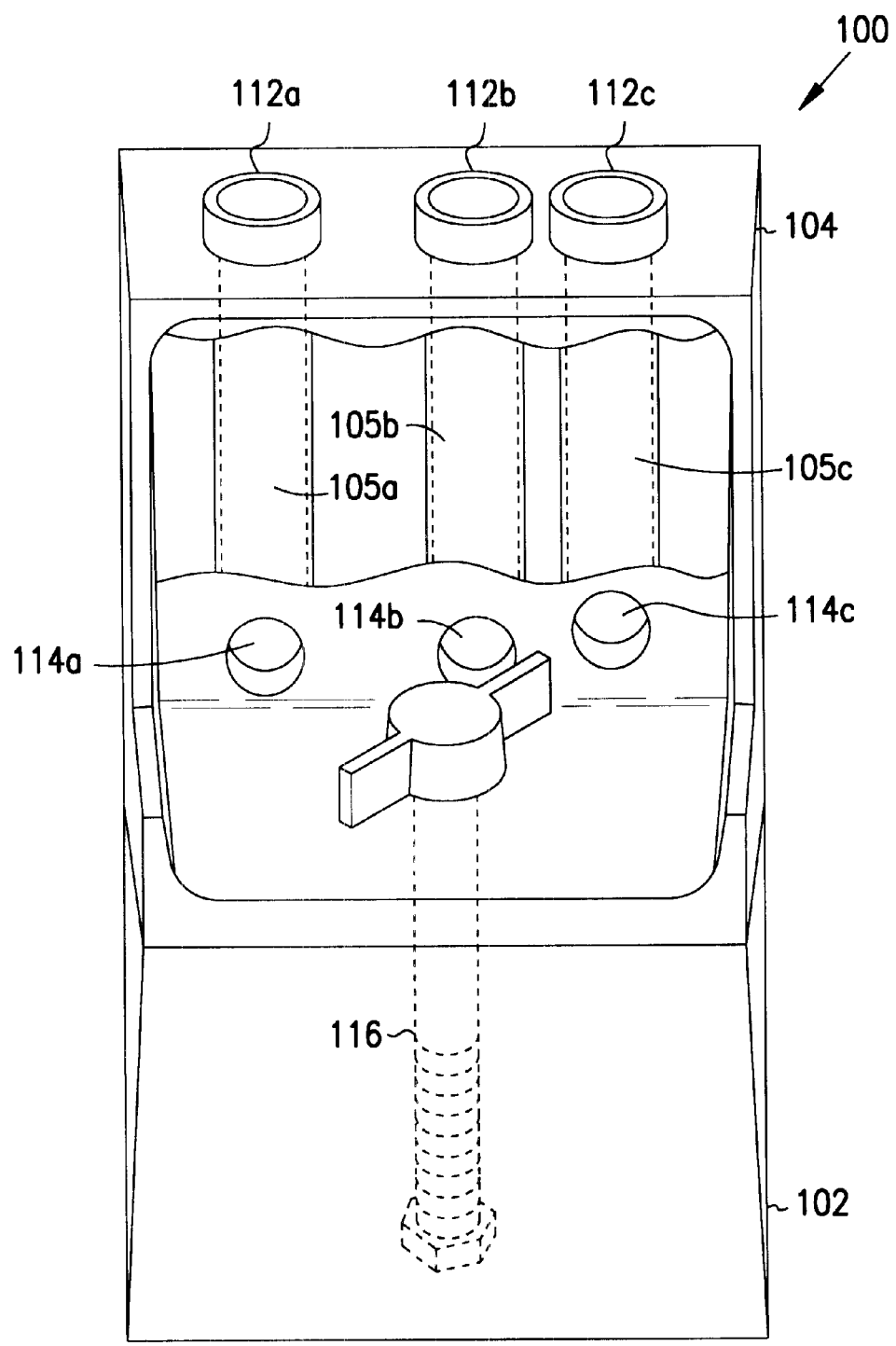
FIG. 1B is a perspective back view of the adjustable holding device in FIG. 1A in one embodiment of the present invention.

The use of three (3) guide channels 105a, 105b and 105c provides for three different two-hole drilling combinations without the use of moving parts. Specifically, pairs of holes can be drilled using the following guide channels combinations, namely, 105a and 105b, 105a and 105c or 105b and 105c. As shown in FIGS. 1A and 1B, the middle guide channel 105b can be spaced a different distance from outer guide channel 105a as compared with outer guide channel 105c to provide additional flexibility. As such, the spacing between the guide channels 105a, 105b and 105c is irregular, but predetermined and fixed. The resulting holes are drilled at the appropriate width and depth in the workpiece, resulting in precisely-aligned pocket holes in a wide range of materials. In an alternative embodiment, only one hole is drilled in a workpiece using the adjustable holding device 100. In another alternative embodiment, more than three (3) guide channels are present, and multiple hole-drilling combinations can be achieved. In yet another embodiment, more than two holes are drilled for one joint in a workpiece, such that all three guide channels are used. In yet another embodiment, an interchangeable set of guides 104 with varying sizes and numbers of guide channels is provided for use with the same base 102.

In a particular embodiment, the front substantially vertical planar surface of the guide 104 is about four (4) to six (6) inches (ten (10) to 15 cm) in height, and about the same width as the base 102. The guide 104 can have any suitable thickness, and can be irregular in shape as long as it has sufficient height and thickness to provide adequate support for the guide channels 105a, 105b and 105c. In one embodiment, the guide 104 has multiple curved portions corresponding with the curvature of each guide channel 105a, 105b and 105c as shown in FIG. 1B. The guide 104 and base 102 are joined together using any suitable type of connecting means, including any combination of bolts, nuts, wing nuts, etc. In the embodiment shown in FIGS. 1A and 1B, a T-bolt and nut assembly 116 is used, although the invention is not so limited. In one embodiment, the T-bolt is comprised of a plastic knob pressed onto any suitable type of bolt. Use of a T-bolt eliminates the need for a separate tool to be used for adjustment, such as a wrench. In another embodiment, a conventional bolt is used instead of the T-bolt.

The base 102 and guide 104 can each be made from any suitable material or any combination of materials, such as wood, wood composites, any type of plastic (e.g., nylon, polyethene, polystyrene, and so forth), any type of magnetic metal or metal alloy (e.g., steels), nonmagnetic metal alloy (e.g., aluminum, aluminum alloys), and so forth. In one embodiment 6063-T5 aluminum alloy is used. In another embodiment, a glass-filled, type 66 nylon is used. Use of a plastic adjustable holding device 100 may also provide a more rigid holding device as compared with certain types of conventional aluminum devices. Each guide channel 105a, 105b and 105c can also be made of any suitable material, such as hardened steel.

Figure 1C:
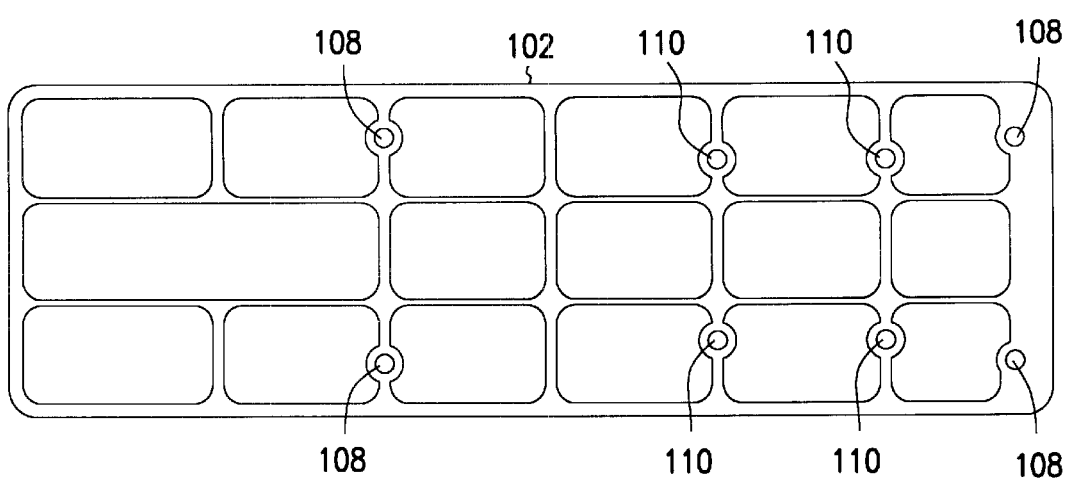
FIG. 1C is a bottom view of a base portion of the adjustable holding device in FIG. 1A in one embodiment of the present invention.

The components of the adjustable holding device 100 can be made by using any suitable process, such as extrusion, injection molding, casting, and so forth. When produced in a die with an extrusion process, material-savings techniques can also be used, including forming openings on the underside of the base 102, as shown in FIG. 1C. Furthermore, if the openings are made substantially symmetrical, as shown in FIG. 1C, the material flows through the die more easily and uniformly. The openings do not need to be of any particular shape or size or located in any particular area of the base 102, as long as the base 102 is structurally sound and has dimensional stability. Such openings also help the resulting extrudate cool faster.

An added benefit of using injection molded plastic for the adjustable holding device 100 is that it allows the guide channels 105a, 105b and 105c to be inserted into the mold and secured into place during the molding process without causing weakening of the guide 104. Since temperatures are generally lower as compared with aluminum or metal fabrication processing, use of an injection molding process has the added benefit of preventing weakening of the guide channels 105a, 105b and 105c themselves. The injection molding process is also more efficient, thus reducing costs, as compared with the time and labor involved in machining guides into a comparable aluminum or metal guide.

In one embodiment, the adjustable holding device 100 provides for the drilling of pocket-holes of approximately 9/16-inch (14 mm), 7/8-inch (22 mm) and 17/16 inch (36 mm) center-to-center spacing. Additionally, use of add-ons, such as a step block (FIGS. 3–4) and riser block (FIGS. 5–6) allows for accurate hole placement in an even wider range of material sizes, including materials ranging from about less than about ½-inch (13 mm) to over two (2) inches (51 mm) thick. In specific embodiments, the materials are about ½-inch (13 mm), ¾-inch (19 mm) and 1½ inch (38 mm) thick.

Figure 2:
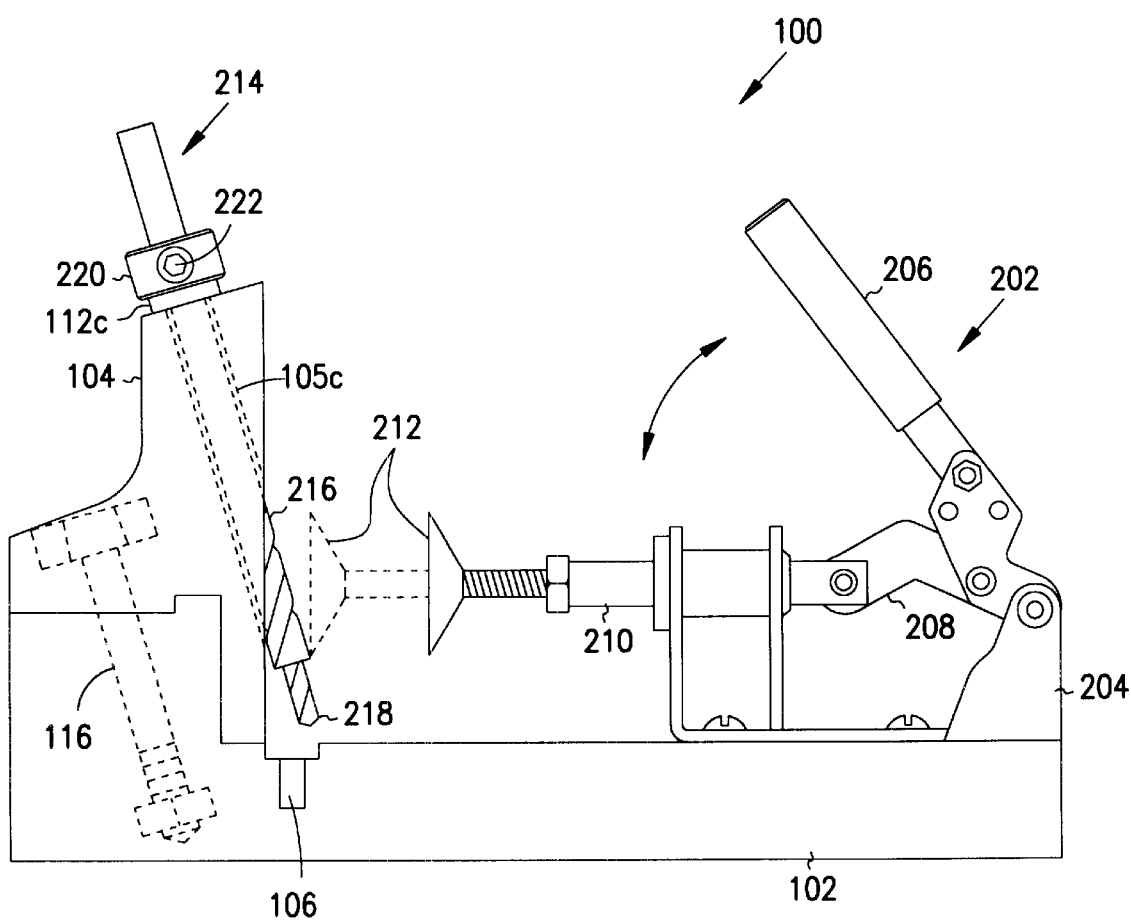
FIG. 2 is a side view of an adjustable holding device in a first position in one embodiment of the present invention.

FIG. 2 provides a side view of an adjustable holding device 100 in a first position, i.e., without any add-ons such as spacers. With the adjustable holding device 100 in this position, i.e., without an added step block or riser block, pocket holes can easily be drilled in work pieces of conventional thicknesses, such as from about ¾ inch (19 mm) to about 1⅛ inch (29 mm). In this embodiment, the adjustable holding device 100 further includes an over-center toggle self-contained clamp 202 attached to the base 102. The clamp 202 includes a mounting bracket 204, a pivotally attached operator handle 206, an over-center link 208, a barrel 210, and an adjustable bumper 212. In other embodiments, other types of clamping means can be used, such as a foot-operated air cylinder, and so forth. (See Sommerfield). FIG. 2 also shows a stepped drill bit 214 that has been inserted into one of the guide channels 105a, although the invention is not so limited. Any suitable type of drill bit 214 can be used, depending on the application.

The stepped drill bit 214 can be of any conventional size and shape. In the embodiment shown in FIG. 2, the stepped drill bit 214 includes a pocket-forming portion 216 and a smaller-diametered guide hole-forming portion 218. An adjustable depth collar 220 can be selectively secured to the pocket forming portion 216 through use of a set screw 222. As FIG. 2 shows, when fully inserted, i.e., at maximum drilling depth, the depth collar 220 is in contact with the stop flange, e.g., 112a. Use of the depth collar 220 also prevents damage to the adjustable holding device 100, since the end of the stepped drill bit 214 is prevented from extending through to the other side of the workpiece.

Figure 3:
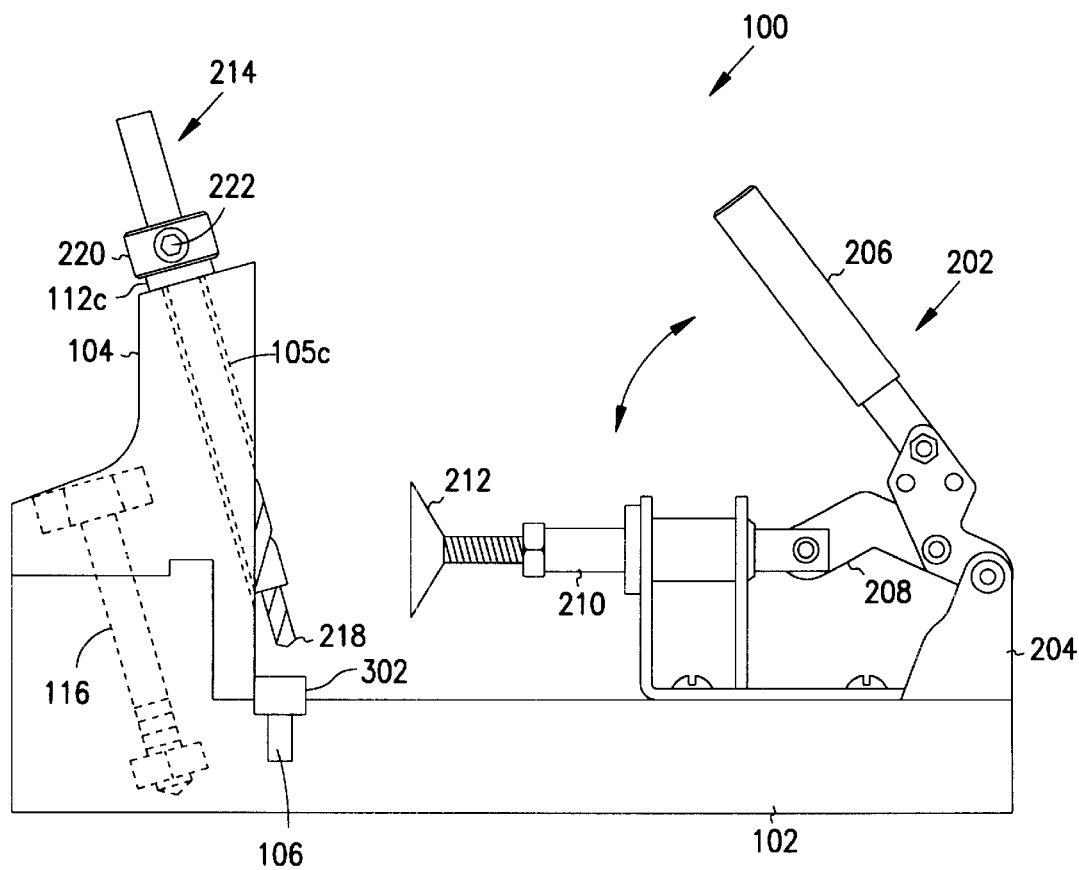
FIG. 3 is a side view of an adjustable holding device in a second position in one embodiment of the present invention.

FIG. 3 shows an adjustable holding device 100 in a second position, i.e., with a removable step block 302 secured to the base 102. Use of the removable step block 302 elevates the horizontal surface upon which a workpiece is placed. Use of the step block 302 also allows for proper placement of a pocket hole in thinner workpieces, such as workpieces less than about ¾-inch (19 mm), down to about ½-inch (13 mm) thick or possibly less, depending on the shape and size of the step block 302. In this way, the pocket hole can be drilled closer to the edge of the workpiece, allowing a screw to exit more towards the center-of-thickness of the workpiece as desired. In one embodiment, the step block 302 snaps into the depression 106, forming a tight fit against the substantially horizontal planar surface of the base 102 and the substantially vertical portion of the guide 104. (See FIG. 4). The step block 302 can be any suitable size and shape. In a particular embodiment, the step block 302 is about three (3) inches (7.6 cm) wide and about 0.3 inches (0.8 cm) high.

Figure 5:
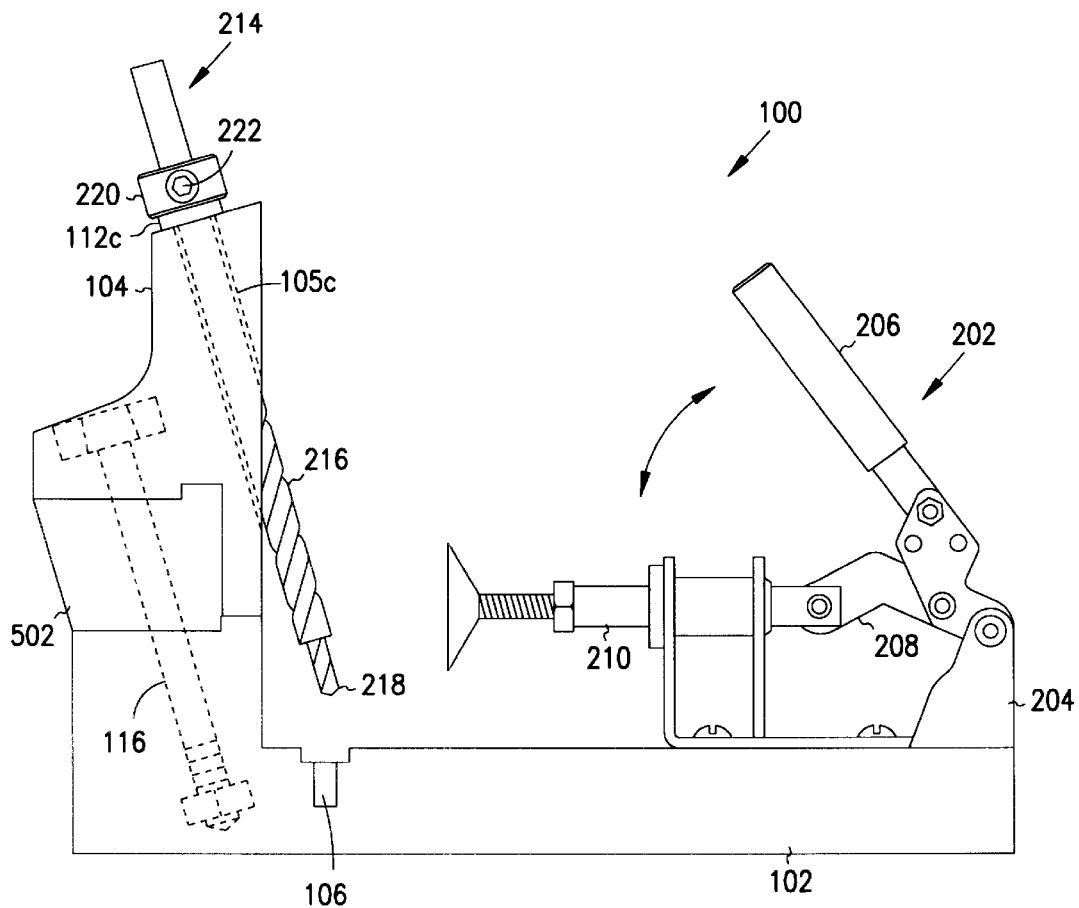
FIG. 5 is a side view of an adjustable holding device in a third position in one embodiment of the present invention.
Figure 6:
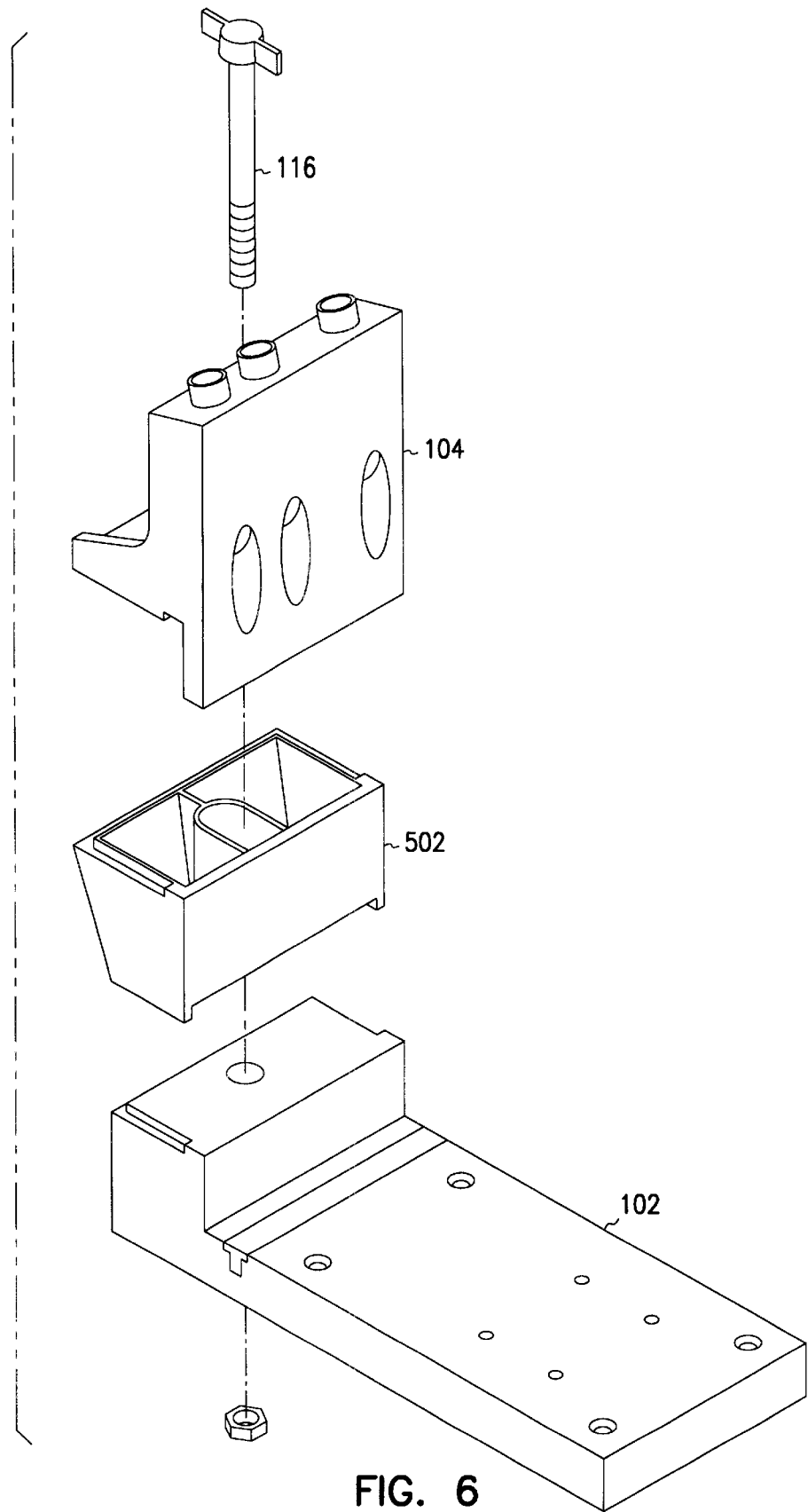
FIG. 6 is an exploded view of the adjustable holding device shown in FIG. 5 in one embodiment of the present invention.

FIG. 5 shows an adjustable holding device 100 in a third position, i.e., with a removable riser block 502 secured between the base 102 and the guide 104 as shown. Use of the riser block 502 allows for proper placement of pocket holes in thicker workpieces, such as workpieces greater than about 1⅛ inches (29 mm), depending on the shape and size of the riser block 502. In this way, a pocket hole can be drilled further from the edge of the workpiece, allowing a screw to exit essentially in the center of the workpiece, as desired. In one embodiment, the riser block 502 is screwed into place using the same screw assembly 116 that holds the guide 104 and base 102 together. (See FIG. 6). The riser block 502 can be any suitable size and shape. In a particular embodiment, the riser block 502 is about 1.3 inches (3.3 cm) high and about three (3) inches (7.6 cm) wide.

In an alternative embodiment, the adjustable holding device 100 is designed to handle materials less than about ¾-inches (19 mm) or greater than about 1⅛ inches (29 mm) thick without an added step block or riser block of any type. This may include a built-in step block and/or riser block or otherwise varying the thickness of and/or relationship between the base and guide. Such embodiments may be useful for speciality work, in which a majority of the workpieces are of various, non-conventional sizes.

Figure 7:
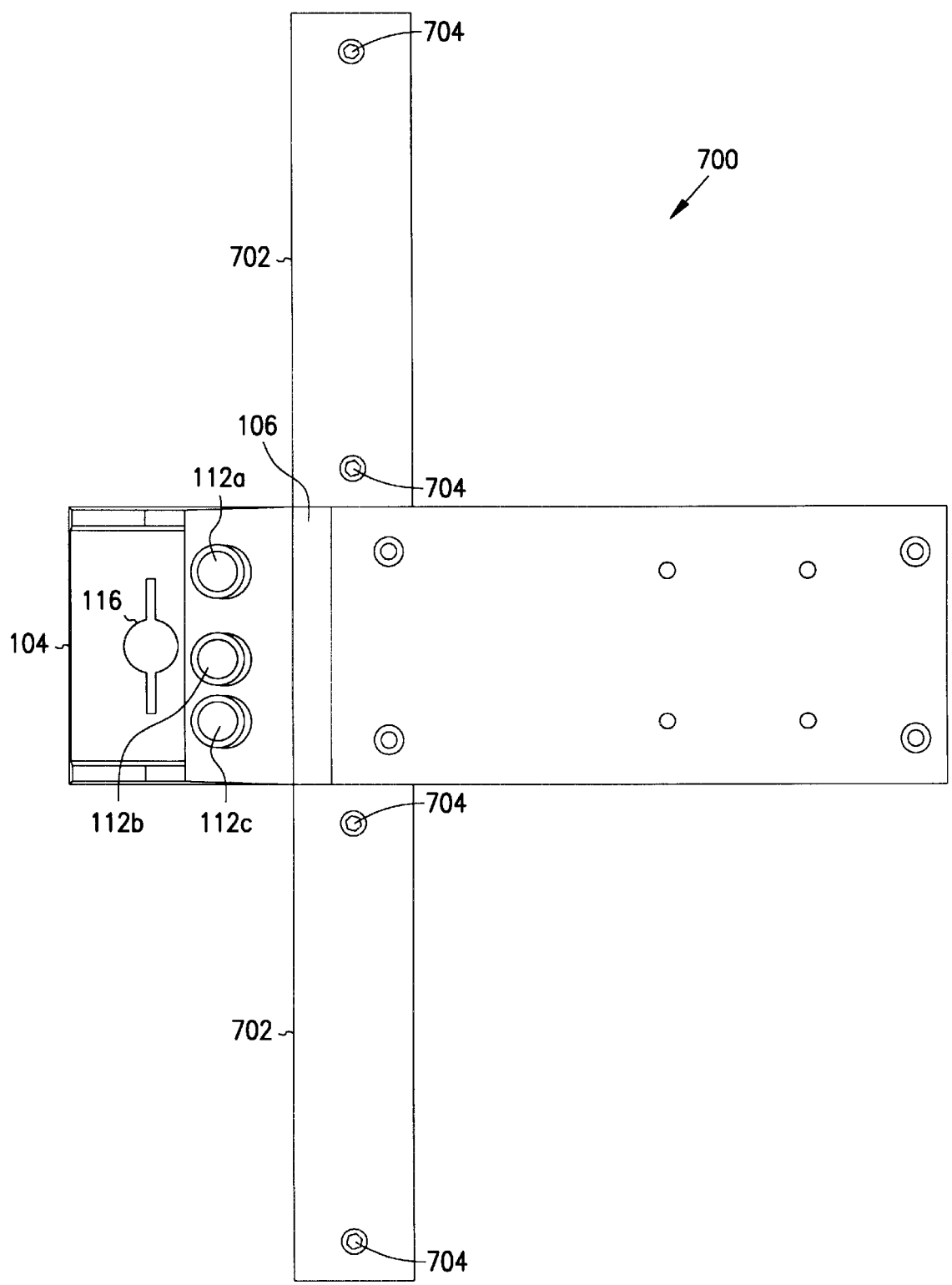
FIG. 7 is a top view of a supported adjustable holding device having support wings in one embodiment of the present invention.

In another embodiment, the adjustable holding device is used in combination with side supports or support wings 702, i.e., a supported adjustable holding device 700, as shown in FIG. 7. In this embodiment, one or more support wings 702 are located on each side of the supported adjustable holding device 700, adjacent to or separated from the base 102. The support wings 702 are repositionable to provide maximum workpiece support, depending upon which drilling position is being used. In one embodiment, only one support wing 702 is used. In another embodiment, multiple support wings 702 are used on one side of the base 102, with zero, one (1) or more than one support wing 702 on the other side of the base 102. The support wings 702 can be in contact with each other or can be spaced apart, if desired. Examples of larger workpieces that can be supported with the support wings 702 include standard cabinet panels and "heavier-dimension" materials, such as "2×4's" (5.1×10.2 cm) to "2×12's" (5.1×30.5 cm), although the invention is not so limited.

The support wings 702 can be made from any suitable material, such as the devices noted above for the base 102 and guide 104, e.g., woods, metals, plastics, and so forth. Each support wing 702 can be any suitable size and shape, although each is preferably about the same height as the base 102 to provide added support for larger workpieces. In the embodiment shown in FIG. 7, each support wing 702 is substantially rectangular in shape. In a particular embodiment, each support wing 702 is about 1½ inches wide (3.8 cm), about eight (8) inches (20.3 cm) long, and about one (1) inch (2.5 cm) thick. The support wings 702 can be secured in any suitable manner to a workbench, such as with screws placed through countersunk screw mounting holes 704, as shown. In one embodiment, the support wings 702 are positioned to be flush or contiguous with the top surface 102 of the base. The support wings 702 are each shown substantially perpendicular to the base, i.e., with the shorter edge abutting the base 102, such that the assembly substantially forms the letter "T." In practice, however, the support wings 702 can be positioned in any manner as required by the particular application.

Figure 8:
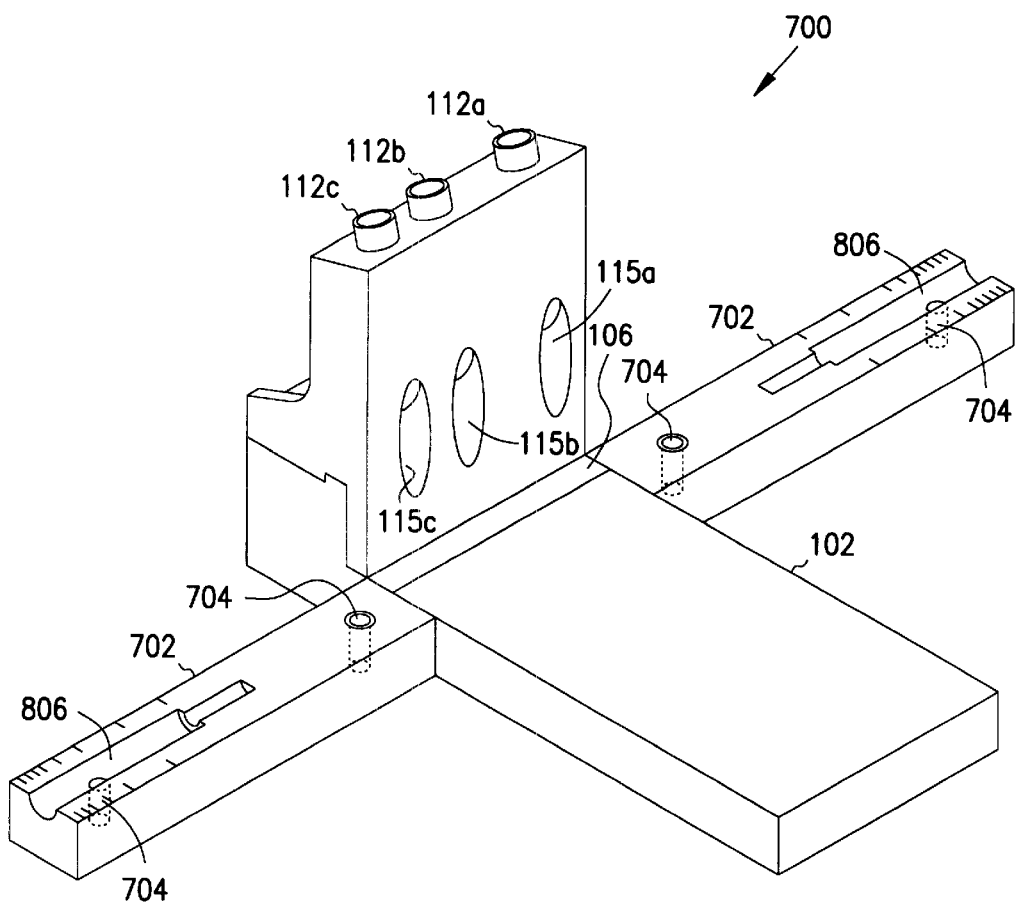
FIG. 8 is a perspective view of a supported adjustable holding device having support wings with drill bit guides and ruler markings in one embodiment of the present invention.
Figure 9:
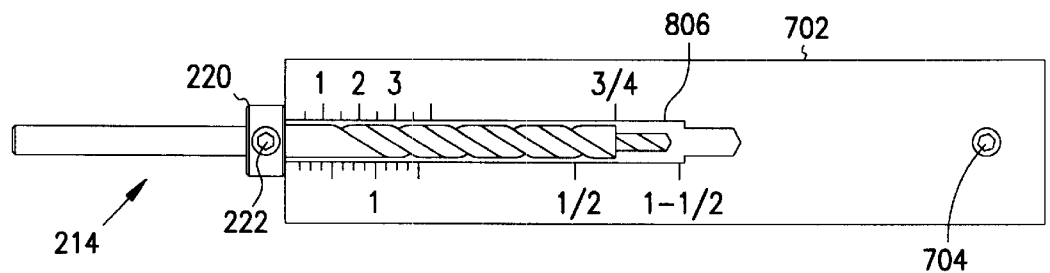
FIGS. 9–11 are top views of a support wing shown in FIG. 8 in use as a drill bit guide for drilling workpieces that are ½-inch (13 mm), ¾-inch (19 mm) and 1½ inches (38 mm) thick, respectively.
Figure 10:
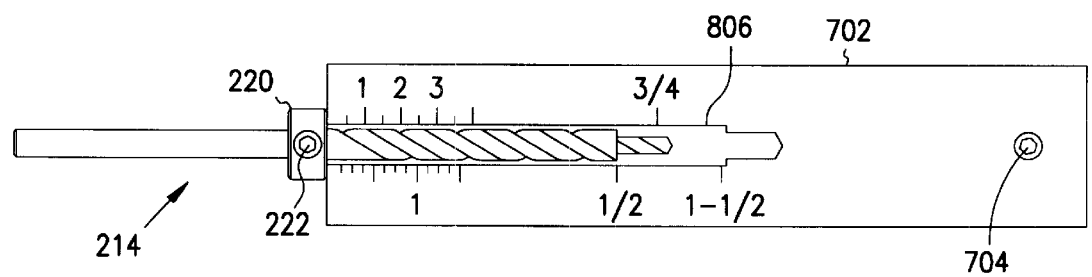
Figure 11:
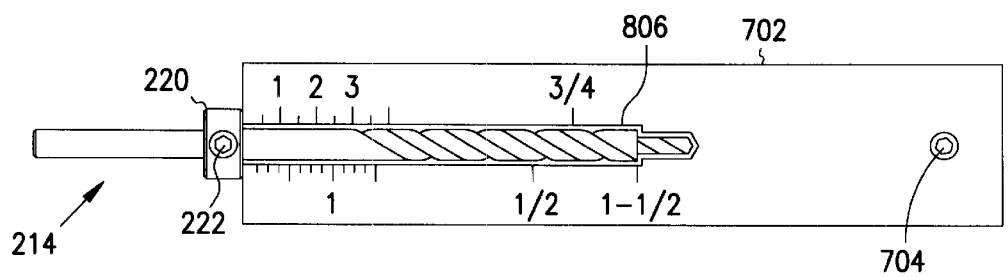

In another embodiment, as shown in FIG. 8, each support wing 702 can also function as a pre-drilling guide through the presence of ruler markings and an embossed area or half-profile 806 recessed into the top surface of the support wing 702. This half-profile 806 conforms to the length-wise half shape of a stepped drill bit. In this way, a stepped drill bit 214 can be positioned into the embossed area 806 and supported, as shown in FIGS. 9–11, while adjustments are made to the location of the depth collar 220. In one embodiment, such adjustments correspond to the thickness of the workpiece being drilled.

Specifically, by aligning the end of the pocket forming portion 216 with the desired location marked on the support wing 702, the depth collar 220 can be positioned (through use of the set screw 222) to abut the outside edge of the support wing 702. The markings of "½", "¾" and "1½" shown on the support wings 702 in FIGS. 9–11 correspond with typical material thicknesses used in the construction and craft trades. In this way, the drill bit 214 can be preset to drill the proper distance into a specific thickness of workpiece.

Figure 4:
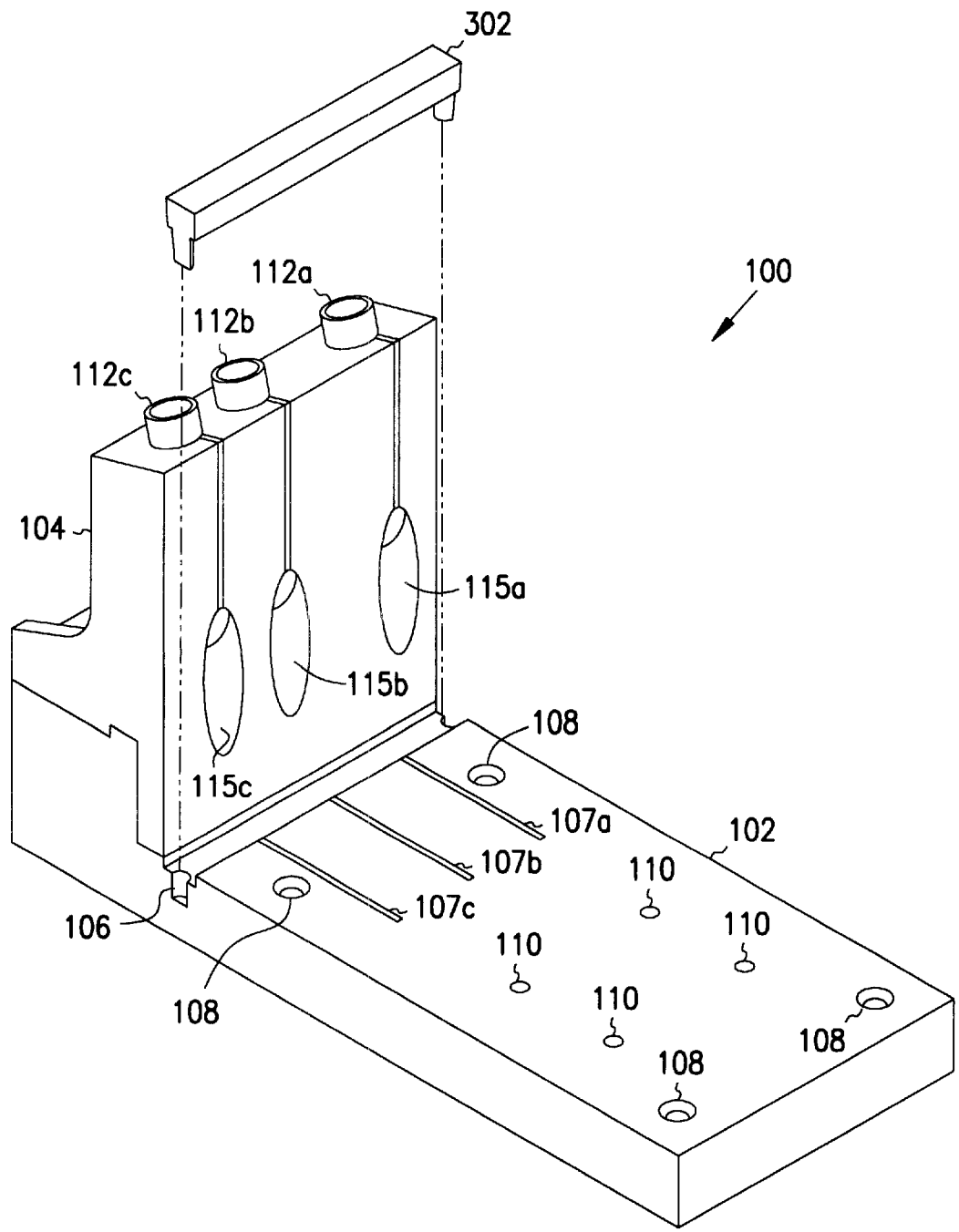
FIG. 4 is a partially exploded view of the adjustable holding device shown in FIG. 3 in one embodiment of the present invention.

In the embodiment shown in FIG. 9, the drill bit 214 has been adjusted to drill pocket and guide holes about ⅞-inches (22 mm) in depth, in a workpiece that is about ¾-inches (19 mm) thick. A drill bit 214 with a depth collar 220 set to this location can be used together with one of the adjustable holding devices (e.g., 100 or 700) of the present invention in the first position (FIG. 2). In the embodiment shown in FIG. 10, the drill bit has been adjusted to drill pocket and guide holes about ⅝-inches (16 mm) in depth, in a workpiece that is about ½-inch (13 mm) thick. A drill bit 214 with a depth collar 220 set to this location can be used together with one of the adjustable holding devices (e.g., 100 or 700) of the present invention in the second position (FIGS. 3–4). In the embodiment shown in FIG. 11, the drill bit 214 has been adjusted to drill pocket and guide holes about 1⅝ inches (41 mm) deep in a workpiece that is about 1½ inches (38 mm) thick. A drill bit 214 with a depth collar 220 set to this location can be used together with one of the adjustable holding devices (e.g., 100 or 700) of the present invention in the third position (FIG. 5). Use of these markings and guides provides a simple and fast method for setting up or changing depth collar settings.

In one embodiment, one support wing 702 carries an English indicia scale and a metric indicia scale. Thus, the wing supports can be used independently of the adjustable holding device as stand-alone gauges for set depth collar setting when using other types of devices. In one embodiment, the markings located towards the outside edge of the support wings 702 shown in FIGS. 9–11 are used as a guide. Such markings are useful for setting shallower depths for the depth collar. This can be useful when counterboring screw holes, for example.

Figure 12A:
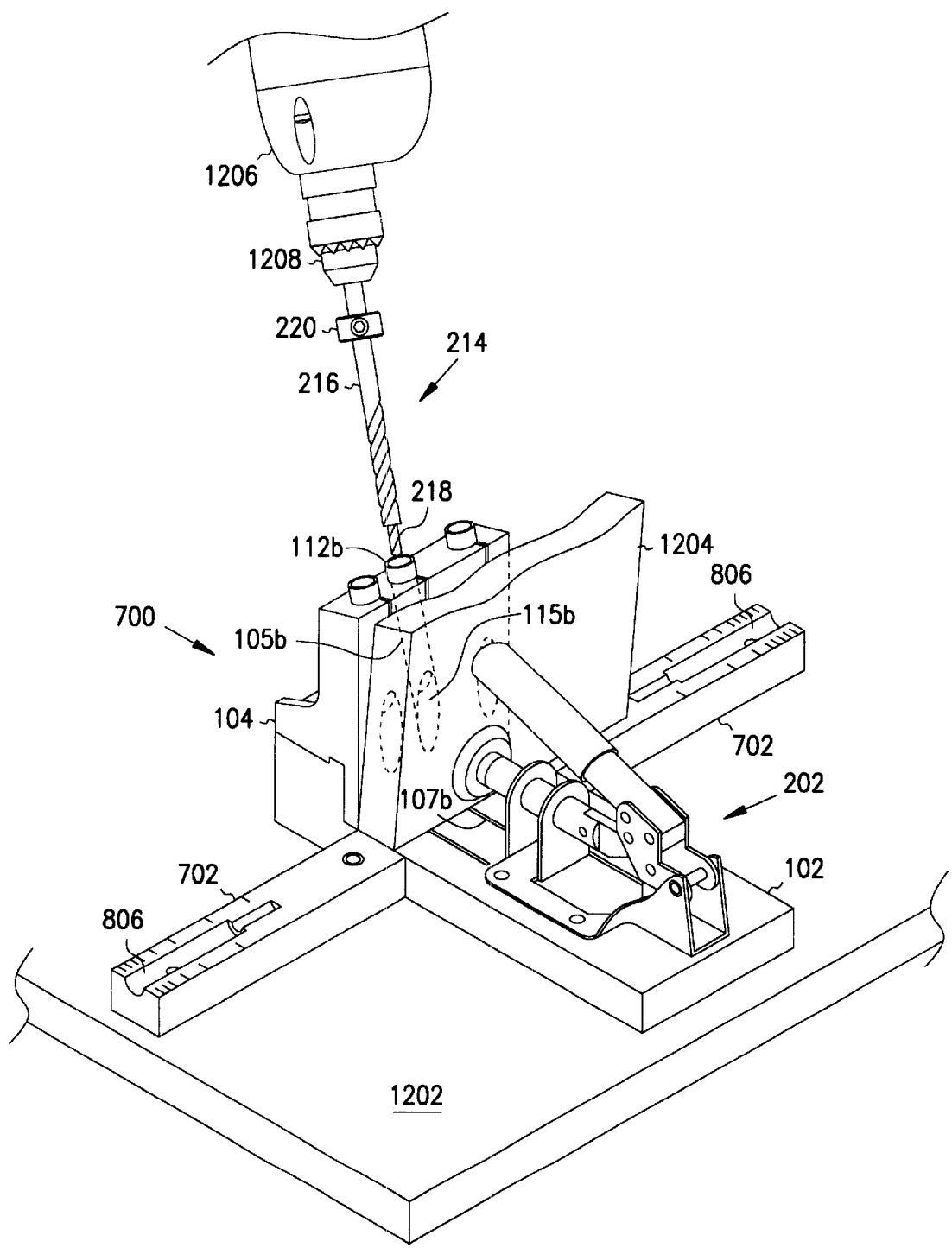
FIGS. 12A–C are perspective views of the supported adjustable holding device shown in FIG. 8 in place on a work surface in various embodiments of the present invention.
Figure 12B:
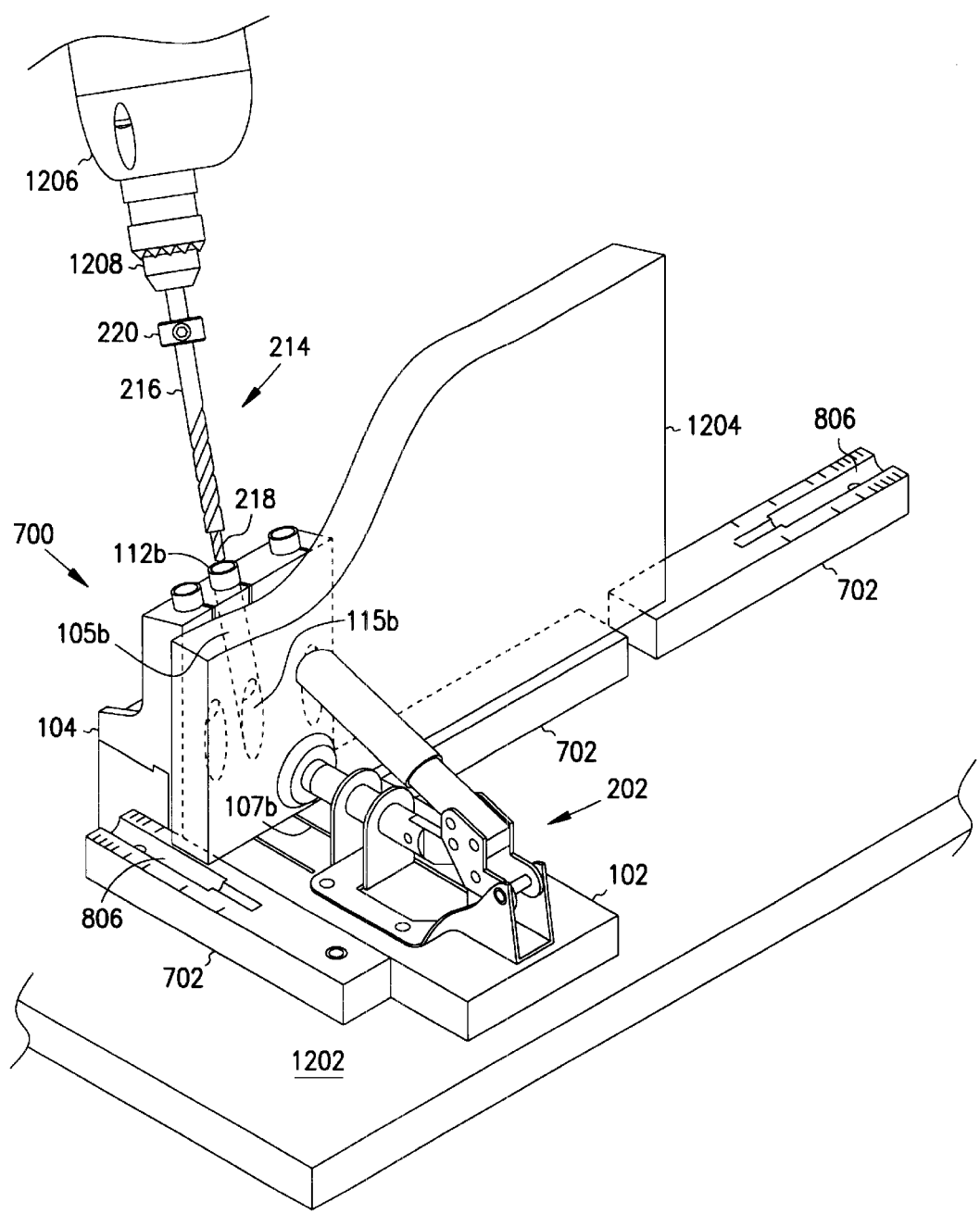
Figure 12C:
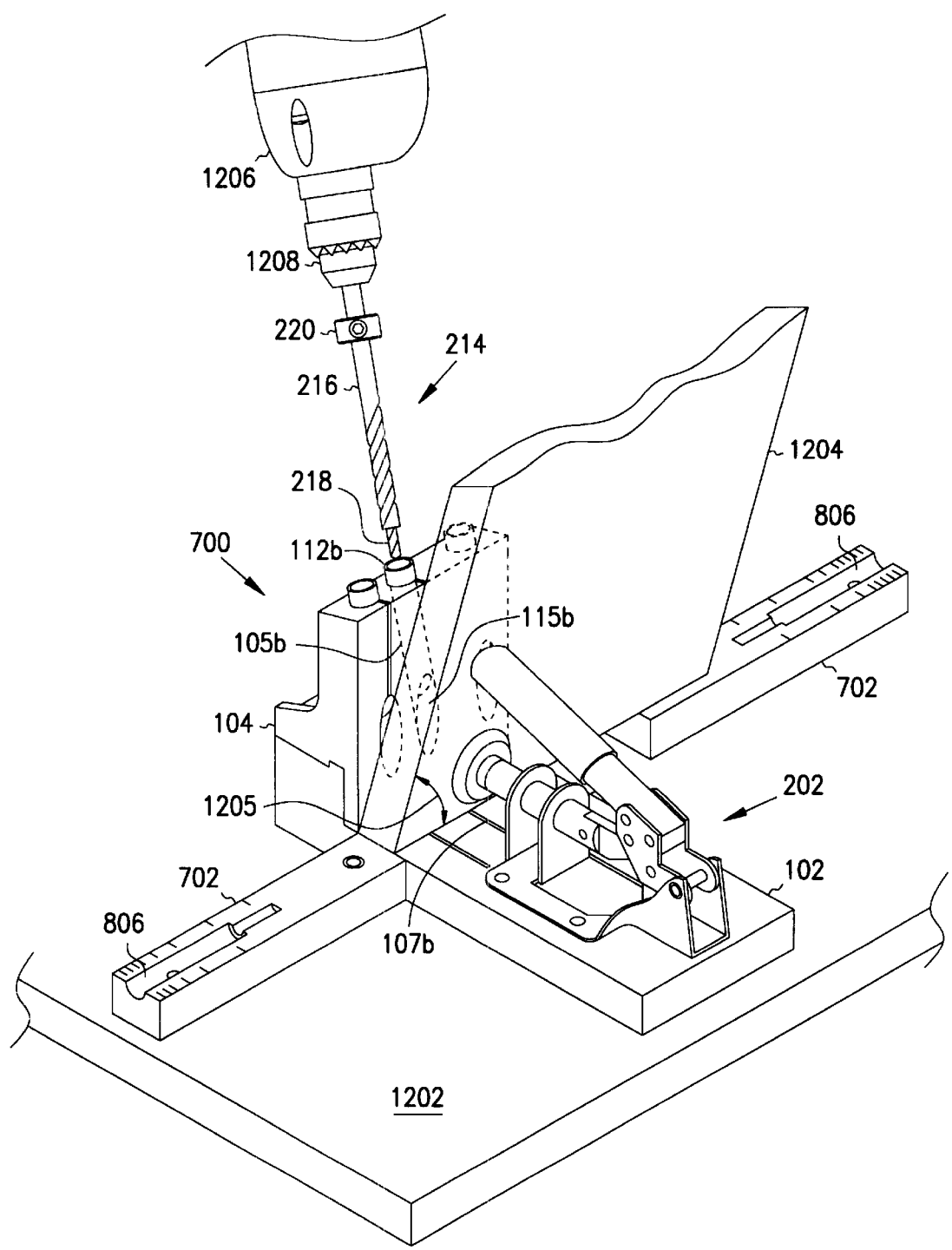

The adjustable holding devices of the present invention can be set on a planar surface, such as a substantially horizontal planar surface. FIGS. 12A–C show a supported adjustable holding device 700 placed on a work surface or table 1202. In one embodiment, the adjustable holding devices are secured to the work surface 1202 and are used as fixed devices or fixtures, although the invention is not so limited. In the embodiments shown in FIGS. 12A–12C, guide channel 112b is about to be used as a guide for drilling a pocket hole in various workpieces using a conventional drill bit 214 secured to a conventional drill 1206 having a chuck 1208. Each workpiece 1204 is being supported by at least one of the support wings 702.

In FIG. 12A, the workpiece 1204 is any type of conventional workpiece, such as a railing. In one embodiment, the workpiece 1204 is larger than a "2×4" (5.1×10.2 cm), up to about a "2×12" (5.1×30.5 cm). In FIG. 12B, the workpiece 1204 is a larger workpiece, such as a cabinet panel, which can come in a variety of shapes and sizes. In one embodiment, the workpiece 1204 is a cabinet panel ranging in size from smaller than 8"×12" (20.3×30.5 cm) up to about "24×36" (61×91 cm) or more. In the embodiment shown in FIG. 12C, the workpiece 1204 is angular, such that it has an angle 1205 of less than 90 degrees. In one embodiment, the angle 1205 is about 45 degrees, such as in a typical miter joint. In another embodiment, the angle 1205 is about 22.5 degrees ("octagonal angle"). In another embodiment, the angle is about 30 degrees ("hexagonal angle").

Figure 13:
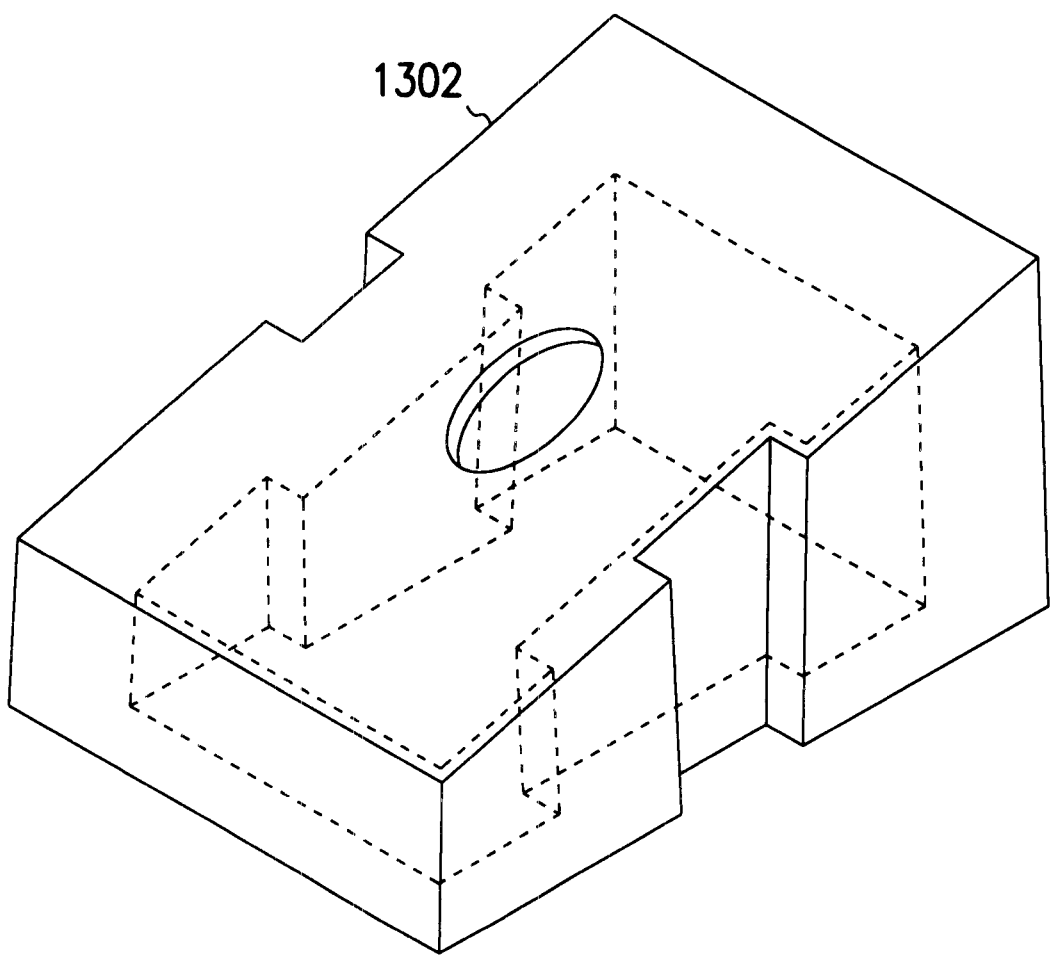
FIG. 13 is a perspective view of a retainer in any of the above embodiments.
Figure 14:
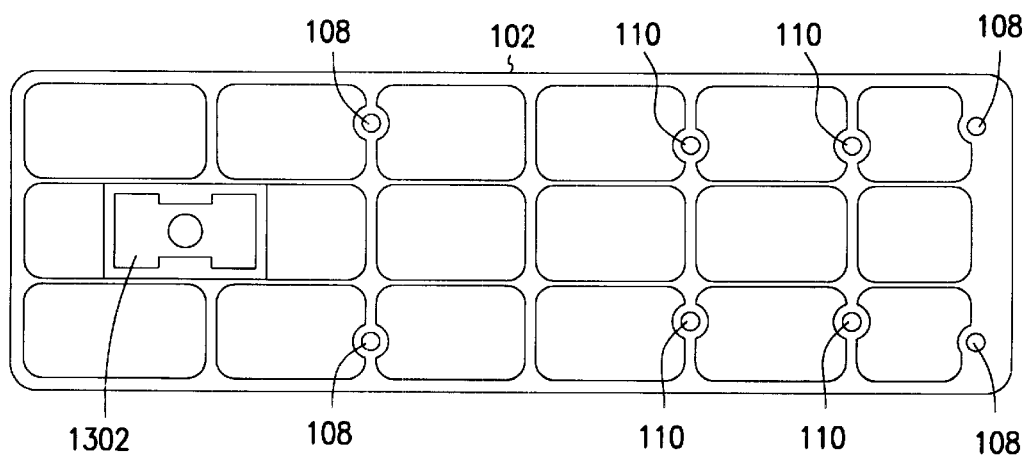
FIG. 14 is a bottom view of the retainer shown in FIG. 13 in place in the bottom of the base in one embodiment of the present invention.
Figure 15:
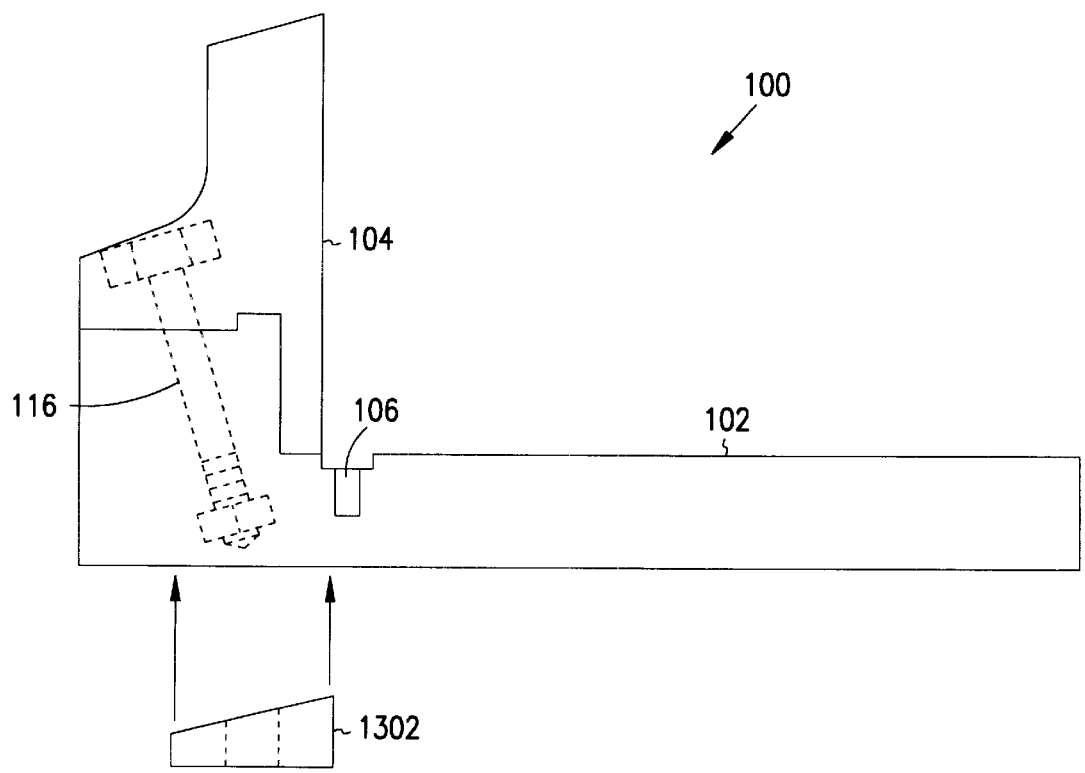
FIG. 15 is a side view of the base and retainer of FIG. 14 in one embodiment of the present invention.

In the embodiments shown in FIGS. 12A–C, a retainer 1302 (see FIG. 13) is used to help keep the base 102 and guide 104 secured together. The retainer 1302 snaps into the bottom of the base 102 as shown in FIGS. 14 and 15. The retainer 1302 serves to hold the nut included in the screw arrangement 116 (shown in FIG. 1B) securely in place so that the base 102 and guide 104 maintain a tight connection.

FIGS. 12A–12C provide a variety of examples of usage of wing supports 702, although the invention is not so limited. For example, in FIG. 12A, there are two wing supports 702, each in contact with one side of the base 102, and each placed substantially perpendicular to the base 102. In FIG. 12B there are three wing supports 702, two of which are in contact with the base 102. In this embodiment, one wing support 702 is placed substantially parallel to the base 102. The wing supports 702 on the other side of the base 102 are substantially perpendicular to the base 102. However, there is a separation or gap between these two wing supports 702. In FIG. 12C, there are two wing supports 702 and only one wing support 702 is in contact with the base 102. In this example, both wing supports 702 are placed substantially perpendicular to the base 102.

In operation, the depth collar 220 can be properly positioned for a workpiece 1204 of a particular thickness by placing the pocket form portion 216 of the drill bit 214 adjacent to the appropriate marking in the drill guide 806 contained on one of the wing supports 702. The drill bit 214 can then be secured in the chuck 1206 of a handheld drill 1208, although the invention is not so limited. Alternatively, the depth collar 220 can be preset to the desired position in any suitable manner before or after the drill bit 214 is secured to the drill 1208. The workpiece 1204 is then secured flush to the planar surface of the guide 104 with the clamp 202. The user then activates the drill 1208, inserting the drill bit 214 into the desired guide channel, e.g., 105b, through the opening in the guide 104 and into the workpiece 1204. The drilling continues until the depth collar 220 engages the stop flange, e.g., 112b. The resulting pocket and guide holes are burr-free, and essentially "near-perfect" with respect to position, size and shape. Another advantage of the adjustable holding device 100 or the supported adjustable holding device 700 is that a second hole can then be easily drilled without making any adjustments to either the workpiece or to the adjustable holding device.

In one embodiment, two appropriately-aligned pocket holes are drilled in a workpiece having one width, the piece is removed, and two more appropriately-aligned pocket holes are drilled in a workpiece having a different width, by selecting the appropriate guide channels from the choices available.

Figure 12D:
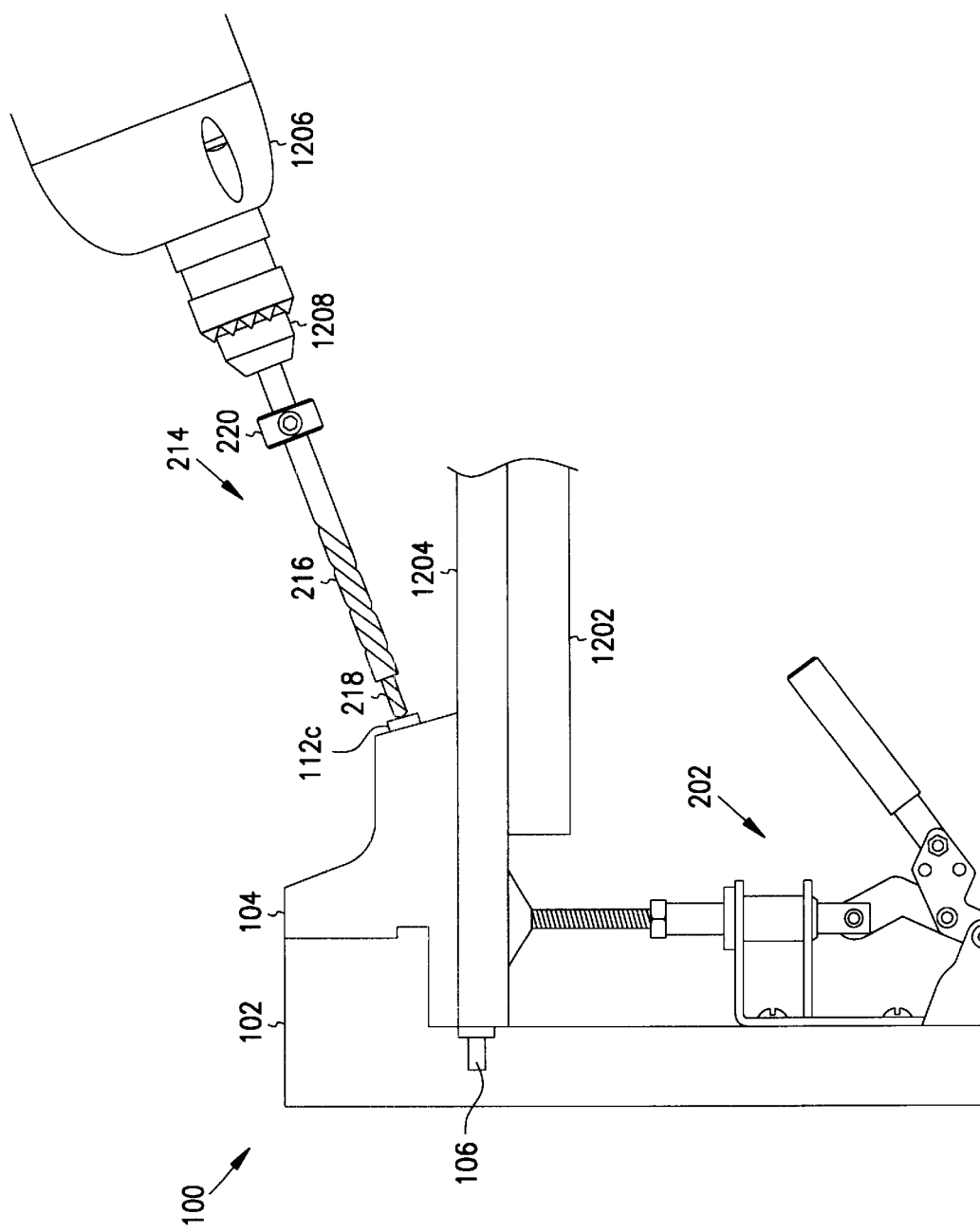
FIG. 12D is a side view of the holding device shown in FIG. 1A in a vertical position with respect to the work surface in one embodiment of the present invention.

FIG. 12D shows an adjustable holding device 100 placed on a workpiece 1204 which has been laid flat on a work surface 1202, i.e., "position 4." In this embodiment, the front of the guide 104 is resting on the top surface of the workpiece 1204 and the clamp 202 is in contact with the bottom surface, such that the workpiece 1204 is secured in place from the bottom side. In an alternative embodiment, the workpiece 1204 does not necessarily extend beyond the edge of the work surface 1202 and the clamp 202 is secured to the bottom of the work surface 1202. Use of the adjustable holding device 100 in this type of manner may be useful when drilling holes in large sheets of material, such as plywood sheeting, e.g., up to six (6) feet by eight (8) feet (1.8 by 2.4 m), or more. As in the previously described embodiments in FIGS. 12A–C, the drill bit 214 shown in FIG. 12D is poised to drill a pocket hole using guide channel 105c (not shown), the upper portion of which forms the stop flange 112c. In this embodiment, it may be possible to use a wing support 702 to properly position the depth collar 220 prior to drilling, even though the wing support 702 is not being used during the drilling process itself.

It is important to position a pocket hole a proper distance from the edge of a workpiece. Because a pocket hole is drilled at an angle, the closer a pocket hole is drilled to the edge of the wood, the closer a screw inserted into the hole will exit the opposing edge of the workpiece. Maximum joint quality is established when a screw exits as close to the center-of-thickness of a material as possible.

Figure 16:
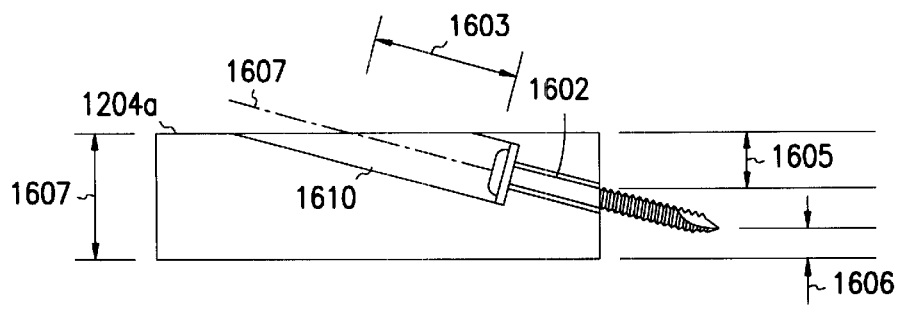
FIGS. 16–18 show the location of a drill bit inside a workpiece during drilling using an adjustable holding device in different embodiments of the present invention.
Figure 17:
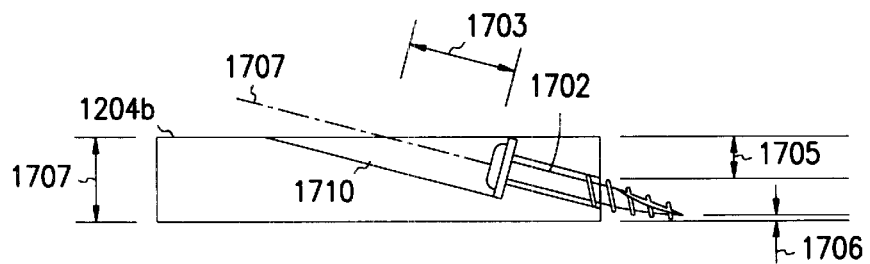
Figure 18:
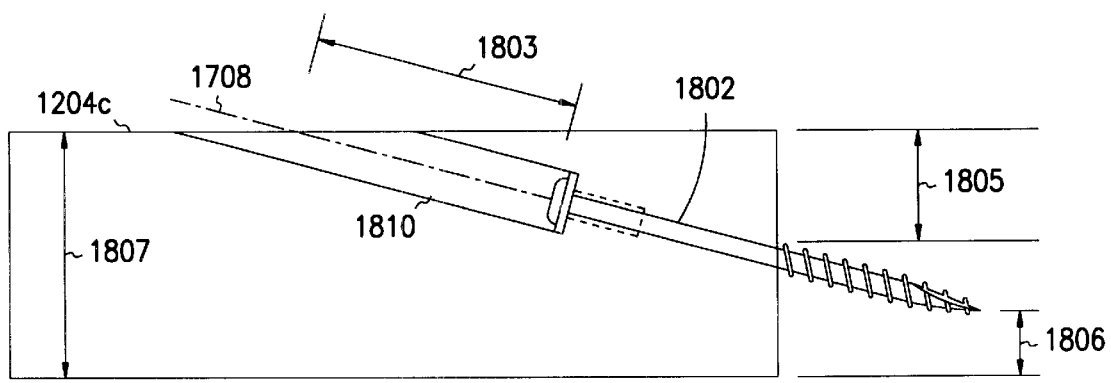

FIGS. 16–18 show examples of workpieces 1204a, 1204b and 1204c of varying thicknesses that have had pocket holes (that include smaller guide holes) drilled using the adjustable holding devices of the present invention. In FIG. 16, the workpiece 1204a, having a thickness 1607 of about ¾-inches (19 mm), has had a pocket and guide hole 1610 drilled using one of the adjustable holding devices of the present invention in a first position (See FIG. 2), although the invention is not so limited. A screw 1602 has been screwed into place using a previously-drilled pocket and guide hole 1610 to join the workpiece 1204a with another workpiece (not shown). In this embodiment, the distance 1603 between the center of the hole 1610 and the head of the screw 1602 is about ⅞-inches (22 mm). The upper edge of the screw 1602 exits the workpiece 1204a at about the center-of-thickness. Distance 1605 is about ⅜-inches (10 mm) and distance 1606 is about ³⁄₁₆-inches (five (5) mm).

In FIG. 17, the workpiece 1204b, having a thickness 1707 of about ½-inch (13 mm), has had a pocket and guide hole 1710 drilled using one of the adjustable holding devices of the present invention in a second position (See FIGS. 3–4), although the invention is not so limited. A screw 1702 has been screwed into place using the previously-drilled pocket and guide hole 1710 to join the workpiece 1204b with another workpiece (not shown). In this embodiment, the distance 1703 between the center of the hole 1710 and the head of the screw 1702 is about ⅝-inch (16 mm). The upper edge of the screw 1702 exits the workpiece 1204b at about the center-of-thickness. Distance 1705 is about ⁵⁄₁₆-inches (eight (8) mm) and distance 1706 is about ¹⁄₁₆-inches (1.65 mm).

In FIG. 18, the workpiece 1204c, having a thickness 1807 of about 1½ inches (38 mm), has had a pocket and guide hole 1810 drilled using one of the adjustable holding devices of the present invention in a third position (See FIG. 5), although the invention is not so limited. A screw 1802 has been screwed into place using the previously-drilled pocket and guide hole 1810 to join the workpiece 1204c with another workpiece (not shown). In this embodiment, the distance 1803 between the center of the hole 1810 and the head of the screw 1802 is about 1⅝ inches (41 mm). The upper edge of the screw 1802 exits the workpiece 1204c at about the center-of-thickness. Distance 1805 is about ¾-inches (19 mm) and distance 1606 is about ²⁷⁄₆₄-inches (11 mm).

To obtain maximum joint quality, it is also important for two pocket holes to be placed sufficiently close together on smaller-width workpieces and spread further apart on larger-width pieces. For example, two holes (as opposed to one) are typically used in attaching a rail to a stile of a cabinet or a leg of a table. Use of the adjustable holding devices of the present invention produced properly placed holes in materials of varying widths.

Figure 19:
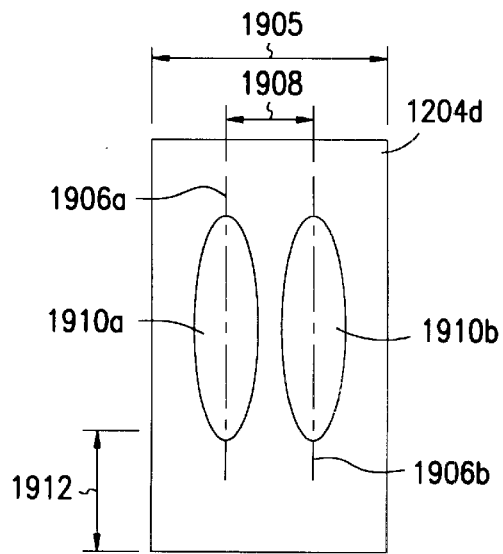
FIGS. 19–21 show pocket holes in workpieces of different sizes in different embodiments of the present invention.
Figure 20:
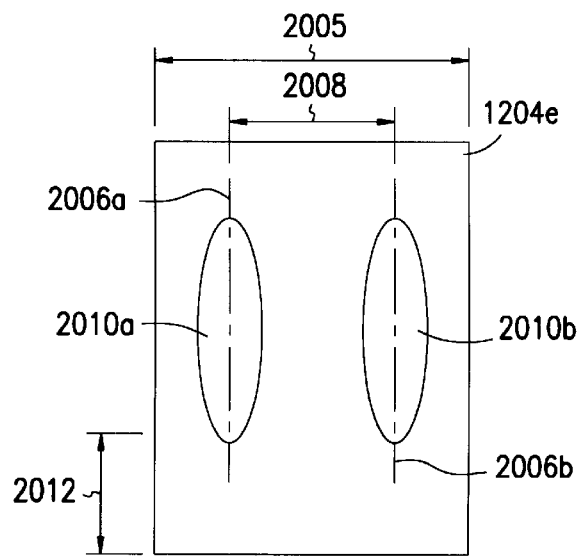
Figure 21:
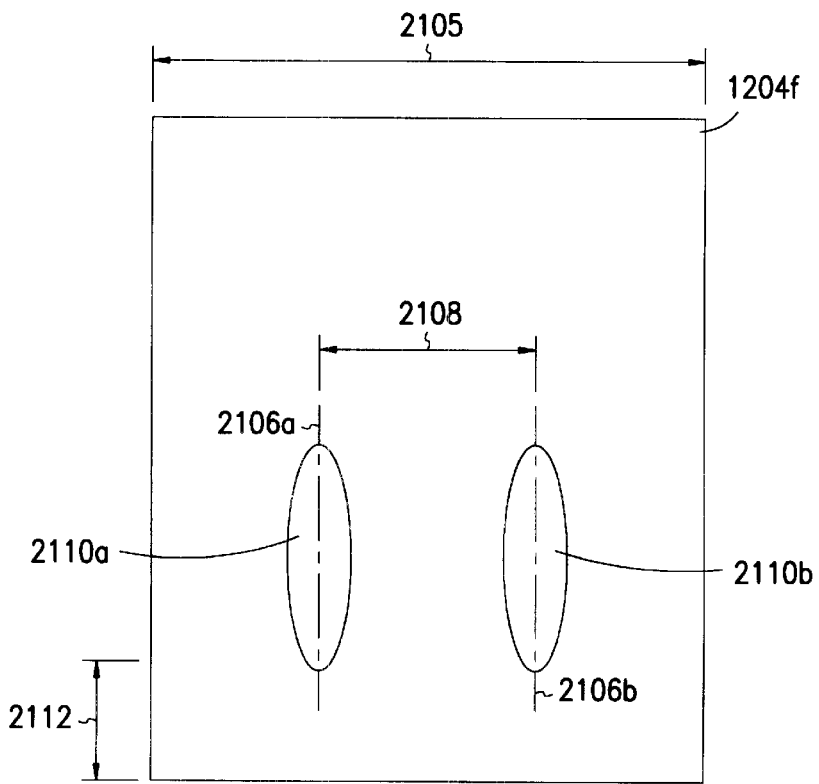

FIGS. 19–21 show examples of workpieces of varying widths that have had pocket holes drilled substantially perpendicular to the edges of the workpieces using the adjustable holding devices of the present invention. Although FIGS. 19–21 are all examples of drill hole combinations drilled using "position 1" shown in FIG. 2, other drill hole combinations are possible using other positions, e.g., position 2 as shown in FIG. 3, position 3 as shown in FIG. 5 and position 4 as shown in FIG. 12D.

In FIG. 19, the workpiece 1204d has a width 1905 of about 1½ inches (38 mm). Each pocket hole 1910a and 1910b has a centerline 1906a and 1906b, respectively. In this example, the centerline-to-centerline distance 1908 between the two pocket holes, 1906a and 1906b is about ⅝-inches (16 mm). The distance 1912 from the edge of the workpiece 1204d and the outer edge of both pocket holes 1906a and 1906b is about ¾ inches.

In FIG. 20, the workpiece 1204e has a width 2005 of about two (2) inches (51 mm). Each pocket hole 2010a and 2010b has a centerline 2006a and 2006b, respectively. In this example, the centerline-to-centerline distance 2008 between the two pocket holes, 2006a and 2006b is about ⅞-inches (22 mm). The distance 2012 from the edge of the workpiece 1204e and the outer edge of both pocket holes 2010a and 2010b is about 9/16 inches (14 mm).

In FIG. 21, the workpiece 1204f has a width 2105 of about 3½ inches (89 mm). Each pocket hole 2110a and 2110b has a centerline, 2106a and 2106b, respectively. In this example, the centerline-to-centerline distance 2108 between the two pocket holes, 2106a and 2106b is about 1 7/16 inches (37 mm). The distance 2112 from the edge of the workpiece 1204f and the outer edge of both pocket holes 2110a and 2110b is about ¾-inches (19 mm).

Figure 22:
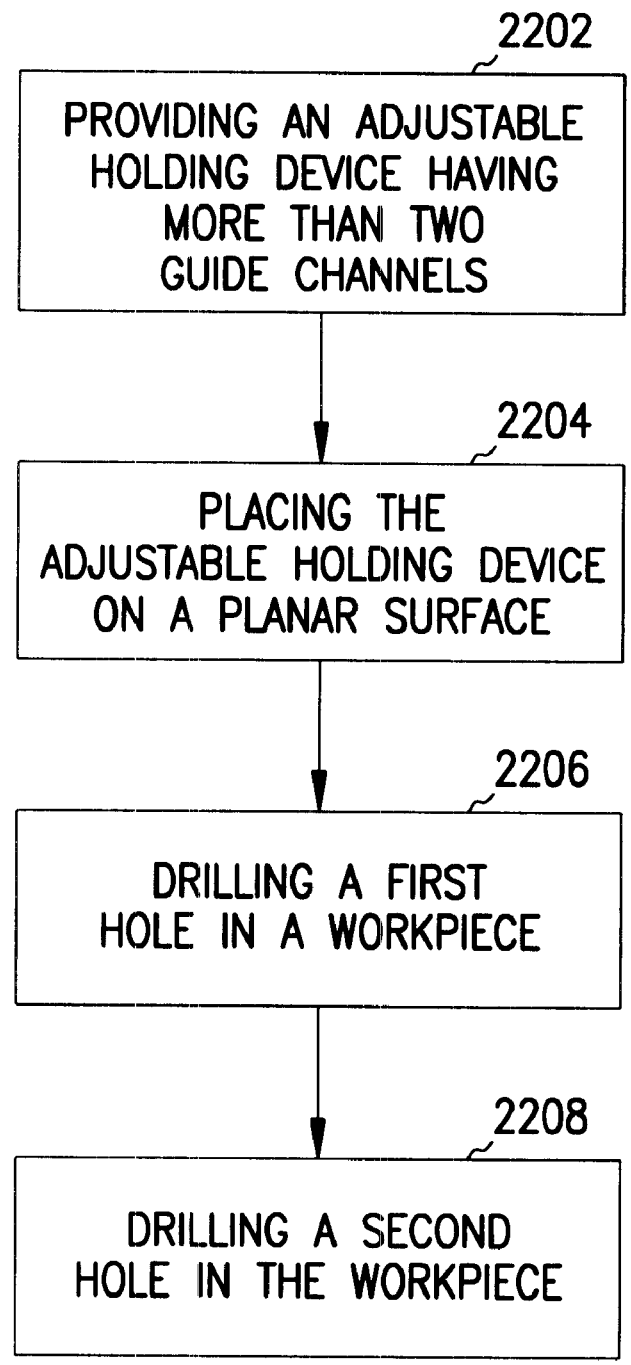
FIG. 22 is a block diagram of one method of drilling pocket holes in one embodiment of the present invention.

In one embodiment, the invention comprises a method for drilling pocket holes in a workpiece as shown in FIG. 22. The method comprises providing 2202 an adjustable holding device having a base and a removable guide, wherein more than two guide channels are angularly disposed within the guide. The method further comprises placing 2204 the adjustable holding device on a planar surface and drilling a first hole 2206 in the workpiece with a stepped drill bit having a depth collar, the workpiece clamped to the adjustable holding device with a clamp. The method can further comprise drilling a second hole 2208 in the workpiece, wherein the first and second holes are both substantially perpendicular to the edge of the workpiece.

The base and removable guide combination of the present invention is designed for use on a planar surface, not for handheld applications. Although it is not necessary to secure the base to the planar surface during operation, the tool can easily be secured to any type of work surface, if desired. Although the base and guide combination is not designed for handheld operations, the guide can be removed and used separately as a type of handheld tool. For example, in the embodiment shown in FIG. 23, the guide 104 has been removed from the base 102 and is being used with a handheld clamp 2302. A drill bit 214 has just drilled a hole into the workpiece 1204. Such a workpiece 1204 can be of any suitable thickness. This type of arrangement may be useful when performing remodeling or repair work, which may require working in tight or awkward positions, such as a preassembled box.

With use of the adjustable holding devices or jigs of the present invention, maximum joint quality can now be achieved more quickly for a wider range of workpiece sizes than has previously been possible with conventional holding devices. Users can now, for the first time, drill pocket holes different distances apart, in materials of varying thicknesses and widths, without the need to adjust the holding device or the workpiece between drilling. The use of three separate and fixed guide channels with varied spacing allows three different two-hole combinations to be drilled quickly and accurately without the use of moving parts. Although such an arrangement does not provide for infinite adjustability, this is not necessary in an industry which is essentially standardized as to positioning of pocket holes in workpieces that are also of standard or stock sizes. However, with the addition of simple add-ons, such as a riser block, step block and/or support wing(s), custom work can be achieved using the adjustable holding devices, without the need to reset the clamp between drillings. This is unlike conventional devices, which require repositioning of the clamp and/or workpiece when there is a need to drill a pocket hole in a different position, e.g., further from or closer to the edge of a workpiece. In one embodiment, markings on the support wings allow for easier and faster setup or change of depth collar settings at a glance. The resulting pocket holes are properly positioned, resulting in maximum joint quality.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. An adjustable holding device comprising:
    a base adapted for use on a work surface;
    a guide removably securable to the base, wherein the guide is substantially perpendicular to the base when secured; and
    more than two fixed guide channels with varied spacing, the more than two fixed guide channels angularly disposed within the guide to guide a drill bit, wherein the more than two fixed guide channels provide multiple hole-drilling combinations.

2. The adjustable holding device of claim 1 comprising three guide channels having varied spacing.

3. The adjustable holding device of claim 2 wherein the adjustable holding device is made from materials selected from the group consisting of wood, metal and plastic.

4. The adjustable holding device of claim 1 further comprising a step block securable to a depression in the base to elevate a workpiece.

5. The adjustable holding device of claim 1 further comprising a riser block securable between the guide and the base to elevate and laterally move the guide backwards.

6. The adjustable holding device of claim 1 further comprising a clamp secured to the base to hold a workpiece in position during drilling with the drill bit.

7. The adjustable holding device of claim 1 wherein the guide channels are made from steel.

8. The adjustable holding device of claim 1 further comprising one or more support wings adjacent to the adjustable holding device, the one or more support wings securable to the planar surface.

9. The adjustable holding device of claim 8 wherein either or both of the one or more support wings have ruler markings in a top surface and a drill-bit shaped half-profile recessed into the top surface, further wherein a depth collar on the drill bit can be adjusted to a desired location when the drill bit is placed in the half-profile.

10. The adjustable holding device of claim 8 wherein the workpiece is about ½ inch (13 mm) to two (2) inches (51 mm) thick or more.

11. A guide containing more than two angularly disposed fixed guide channels with varied spacing to guide a drill bit, wherein the more than two fixed guide channels provide multiple hole-drilling combinations.

12. The guide as recited in claim 11 adapted for use with a handheld clamp.

13. An adjustable holding device comprising:

a base adapted for use on a work surface;

a plurality of interchangeable guides removably securable to the base, wherein each guide is substantially perpendicular to the base when secured; and more than two fixed guide channels with varied spacing, the more than two fixed guide channels angularly disposed within each of the plurality of interchangeable guides to guide a drill bit, wherein the more than two fixed guide channels provide multiple hole-drilling combinations.

14. The device of claim 13 wherein each of the plurality of interchangeable guides provide different multiple hole-drilling combinations.

15. The device of claim 14 wherein the plurality of interchangeable guides are of varying sizes.

16. The device of claim 14 wherein the plurality of interchangeable guides have more than three fixed guide channels.

* * * * *

UNITED STATES PATENT AND TRADEMARK OFFICE
CERTIFICATE OF CORRECTION

| | | |
|---|---|---|
| PATENT NO. | : 6,481,937 B1 | Page 1 of 1 |
| DATED | : November 19, 2002 | |
| INVENTOR(S) | : Todd Sommerfeld and Craig A. Sommerfeld | |

It is certified that error appears in the above-identified patent and that said Letters Patent is hereby corrected as shown below:

<u>Title page,</u>
Item [73], Assignee, insert -- Todd Sommerfeld, Ankeny, IA (US) --.

Item [56], OTHER PUBLICATIONS, delete "Magizine" and insert -- Magazine --.

Signed and Sealed this

Twenty-seventh Day of May, 2003

JAMES E. ROGAN
*Director of the United States Patent and Trademark Office*